United States Patent
Matsumoto et al.

(10) Patent No.: US 10,527,718 B2
(45) Date of Patent: Jan. 7, 2020

(54) RADAR DEVICE, SIGNAL PROCESSING DEVICE FOR RADAR DEVICE AND VELOCITY MEASURING METHOD FOR RADAR DEVICE

(71) Applicant: FUJITSU TEN LIMITED, Kobe-shi, Hyogo (JP)

(72) Inventors: Toshihiro Matsumoto, Kobe (JP); Junko Kajiki, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 301 days.

(21) Appl. No.: 15/260,912

(22) Filed: Sep. 9, 2016

(65) Prior Publication Data
US 2017/0082744 A1 Mar. 23, 2017

(30) Foreign Application Priority Data
Sep. 17, 2015 (JP) .................................. 2015-184494

(51) Int. Cl.
*G01S 13/58* (2006.01)
*G01S 7/35* (2006.01)
*G01S 13/34* (2006.01)

(52) U.S. Cl.
CPC ............ *G01S 13/584* (2013.01); *G01S 7/352* (2013.01); *G01S 13/343* (2013.01); *G01S 13/931* (2013.01); *G01S 2007/356* (2013.01)

(58) Field of Classification Search
CPC ................................ G01S 13/584; G01S 7/352
See application file for complete search history.

(56) References Cited

U.S. PATENT DOCUMENTS

| | | | | |
|---|---|---|---|---|
| 5,563,602 A * | 10/1996 | Stove | ...................... | G01S 13/24 342/70 |
| 5,920,280 A * | 7/1999 | Okada | .................... | G01S 13/345 342/109 |
| 6,434,506 B1 * | 8/2002 | Eckersten | ............. | G01S 13/583 342/112 |
| 6,606,052 B1 * | 8/2003 | Miyahara | .............. | G01S 13/343 342/107 |

(Continued)

FOREIGN PATENT DOCUMENTS

| | | |
|---|---|---|
| JP | H06-350395 A | 12/1994 |
| JP | 2004-069340 A | 3/2004 |

(Continued)

*Primary Examiner* — Marcus E Windrich
(74) *Attorney, Agent, or Firm* — Oliff PLC

(57) ABSTRACT

There is provided a radar device. A transmitting unit transmits first and second transmission signals generated based on first and second parameters for computing relative velocities in first and second detection velocity ranges, respectively. The second detection velocity range is narrower than the first detection velocity range. A receiving unit receives the reflected waves of the first and second transmission signals from a target as first and second reception signals, respectively. A velocity measuring unit computes first and second relative velocities in the first and second detection velocity ranges based on the first and second reception signals, respectively and obtains the velocity measurement result of the relative velocity of the target based on the combination of the first and second relative velocities.

10 Claims, 17 Drawing Sheets

(56) References Cited

U.S. PATENT DOCUMENTS

| | | | | |
|---|---|---|---|---|
| 7,242,344 B2* | 7/2007 | Mitsumoto | ............ | G01S 5/0226 342/109 |
| 2012/0194377 A1* | 8/2012 | Yukumatsu | ............ | G01S 13/931 342/70 |
| 2012/0235854 A1* | 9/2012 | Testar | ................. | G01S 7/35 342/109 |
| 2015/0285897 A1* | 10/2015 | Kilty | .................. | G01S 7/02 342/195 |
| 2015/0323660 A1* | 11/2015 | Hampikian | ............ | G01S 13/58 342/109 |
| 2016/0124085 A1* | 5/2016 | Mende | ................ | G01S 13/343 342/109 |
| 2017/0115386 A1* | 4/2017 | Morinaga | ............... | G01S 13/34 |

FOREIGN PATENT DOCUMENTS

| | | |
|---|---|---|
| JP | 2016-003873 A | 1/2016 |
| WO | 2011/007828 A1 | 1/2011 |

\* cited by examiner

FIG. 1
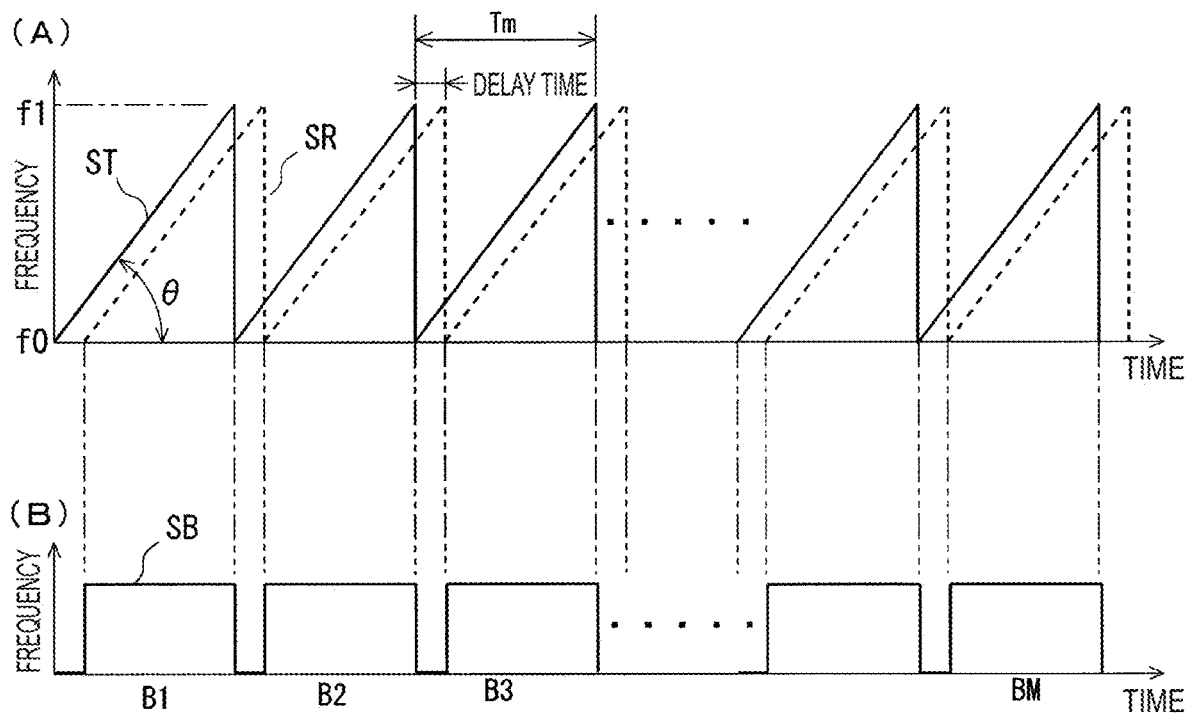
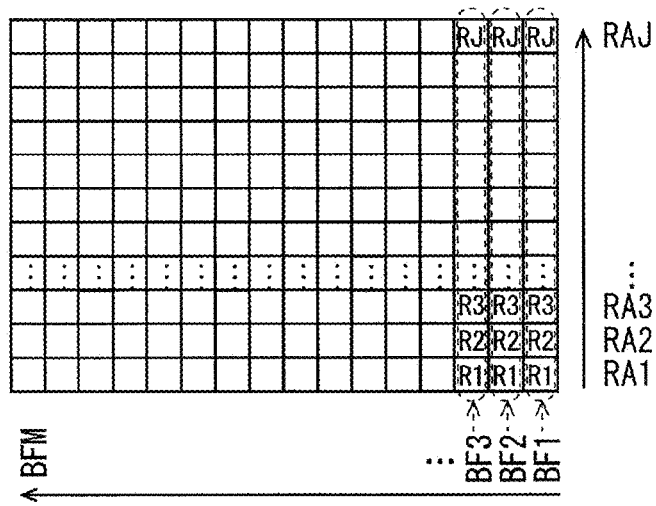

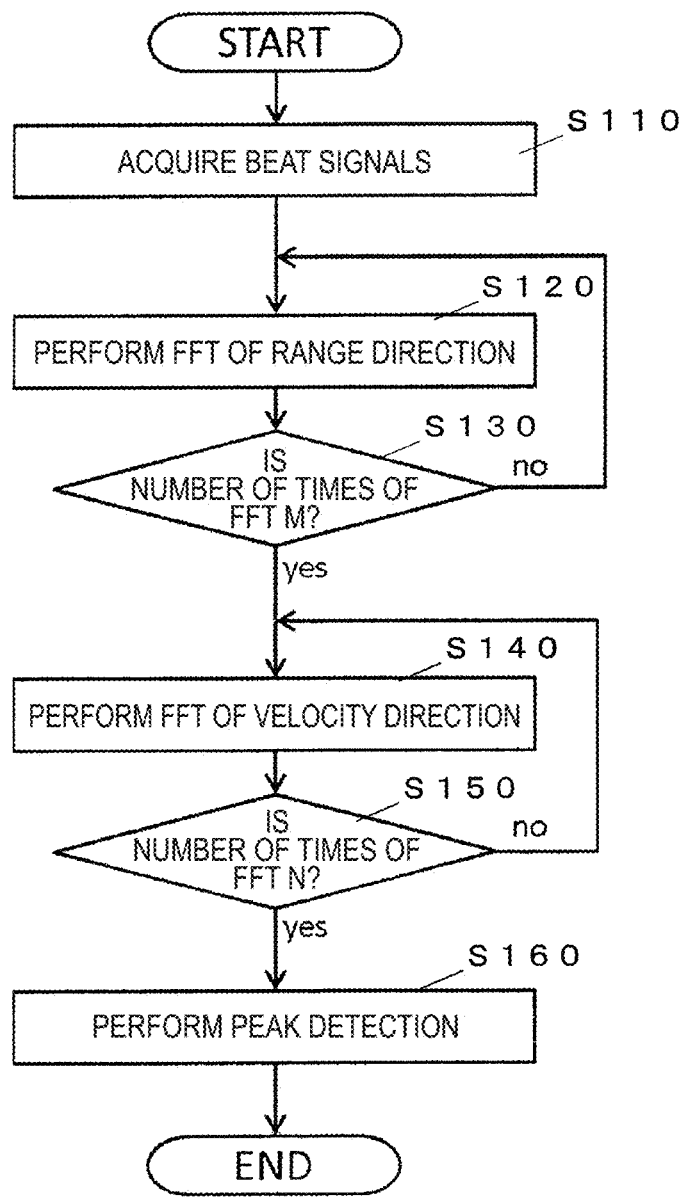

|      | BASIC PARAMETER | FIRST PARAMETER | SECOND PARAMETER | THIRD PARAMETER |
|------|-----------------|-----------------|------------------|-----------------|
| Vmax | 600             | 300             | 12               | 10              |
| Vmin | 1               | 20              | 8                | 1               |

|      | BASIC PARAMETER | FIRST PARAMETER | SECOND PARAMETER | THIRD PARAMETER |
|------|-----------------|-----------------|------------------|-----------------|
| Vmax | 18              | 9               | 2                | 6               |
| Vmin | 1               | 2               | 1                | 4               |

RADAR DEVICE, SIGNAL PROCESSING DEVICE FOR RADAR DEVICE AND VELOCITY MEASURING METHOD FOR RADAR DEVICE

CROSS-REFERENCE TO RELATED APPLICATIONS

This application is based on and claims priority from Japanese Patent Application No. 2015-184494 filed on Sep. 17, 2015.

TECHNICAL FIELD

The present invention relates to a technology related to a radar device for detecting targets, a signal processing device, and a velocity measuring method.

RELATED ART

FMCW (Frequency Modulated Continuous Wave) type radar devices are known as radar devices for detecting targets. A FMCW type radar device transmits a transmission signal at a predetermined modulation frequency. If the transmission signal is reflected from a target, the radar device receives the reflected wave, and generates a beat signal representing the deviation between the frequency of the transmission signal and the frequency of the reflected wave. Subsequently, the radar device performs fast Fourier transform on the beat signal, thereby obtaining a frequency spectrum, and performs processing such as maximum peak detection on the frequency spectrum, thereby obtaining a beat frequency, and computes the relative distance between the radar device and the target, and the relative velocity of the target. Also, the radar device performs determination on frequency aliasing, using the beat frequency. In a case where frequency aliasing has occurred, the radar device corrects the beat frequency, and then computes the relative distance between the radar device and the target and the relative velocity of the target, on the basis of the corrected beat frequency.

In Patent Document 1, a radar device is proposed. In order to compute the distance and relative velocity between the radar device and a target by a FMCW system, the radar device determines whether frequency aliasing has occurred, on the basis of the high-frequency components of a beat signal. In a case where frequency aliasing has occurred, the radar device corrects the beat signal, and computes the distance and relative velocity between the radar device and the target, on the basis of the corrected beat signal.

Also, in Patent Document 2, a signal processing circuit for a detecting device to detect Doppler frequencies from targets is proposed. The signal processing circuit of Patent Document 2 digitizes an analog signal at a predetermined sampling frequency, thereby obtaining digital data, and performs filtering with a filter which passes only data of a desired frequency band, and thins out the time series data having passed through the filter, and performs Fourier transform on the thinned data, and obtains the frequency of a desired signal on the basis of the output of the Fourier transform and information on the passband of the filter.

Patent Document 1: Japanese Patent Application Publication No. 2004-069340A

Patent Document 2: Japanese Patent Application Publication No. H06-350395A

Recently, as radar devices for detecting targets, FCM (fast chirp modulation) type radar devices have been proposed. In an FCM system, a process of pairing up peaks and down peaks is unnecessary, unlike in an FMCW system. Therefore, a false target recognition problem attributable to false pairing does not occur, and it is possible to expect more accurate target detection.

Here, a method of computing distance and relative velocity in the FCM system will be described in brief.

When the waveform of one period of a transmission wave in which the frequency varies like a saw-tooth wave is defined as one chirp, the FCM system transmits a plurality of chirps with a period shorter than that in the FMCW system, and receives reflected waves from a target, as reception signals, and obtains the differences between each of the reception signals and the transmission wave, thereby obtaining beat signals, and performs two-dimensional FFT (Fast Fourier Transform) on the beat signals, thereby obtaining the distance and relative velocity between the target and the radar device. Specifically, since the time delays of the reception signals relative to the transmission wave increase as the distance of the target increases, the frequencies of the beat signals are proportional to the distance. Therefore, if an FFT process is performed on each beat signal, a peak appears at the position of a frequency corresponding to the distance of the target. Also, since FFT can extract a reception level and phase information at each of frequency points (hereinafter, also referred to as range bins) set at intervals of a predetermined frequency, accurately, a peak appears at a frequency range bin corresponding to the distance of the target. Therefore, it is possible to obtain the distance to the target by detecting the peak frequency. Since the FFT process for obtaining the distance to the target is performed on each beat signal, the FFT process is repeated the same number of times as the number of beat signals, that is, the number of chirps.

Now, relative velocity computation will be described. In a case where there is a relative velocity between the vehicle and the target, the FCM system detects a Doppler frequency between the beat signals, using phase change attributable to the Doppler frequency, thereby computing the relative velocity. In other words, if the relative velocity is 0, since there is no Doppler component between the reception signals, all of the phases of the reception signals related to the individual chirps become same. Meanwhile, in a case where there is a relative velocity between the vehicle and the target, a phase change is caused by a Doppler frequency between the reception signals related to the individual chirps. Since peak information obtained by performing FFT on the beat signals includes such phase information, if the peak information of the same target obtained from the individual beat signals is arranged in time series, and the second FFT is performed, the Doppler frequency is obtained from the phase information, and a peak appears at the position of the obtained frequency. This peak frequency corresponds to the relative velocity.

As described above, it is possible to compute the distance and the relative velocity by performing two-dimensional FFT on the beat signals. Since the FFT process for obtaining the relative velocity is performed on each range bin of the result of the first FFT process, it is repeated the same number of times as the number of range bins. Also, in the above described example, the distance between the target and the radar device is obtained by the first FFT process, and the relative velocity between the target and the radar device is obtained by the second FFT process. However, the computation method is not limited thereto, and it is possible to obtain the relative velocity between the target and the radar device by the first FFT process and obtain the distance between the target and the radar device by the second FFT process. Even though the order of the FFT processes is changed, the same distance and relative velocity as those in the above described example are obtained by a two-dimensional FFT process. In other words, the two-dimensional FFT process analyzes frequency change based on the distance or phase change based on the relative velocity by the first (one-dimensional) FFT process, and performs analysis of the time-series data of the individual bins of the result of the second (one-dimensional) FFT process.

As described above, the FCM system consecutively transmits the plurality of chirps, and consecutively receives the plurality of reception signals corresponding to the chirps, and obtains a Doppler frequency from phase change between the consecutive reception signals, thereby performing velocity measurement. Therefore, the detection velocity range is determined on the basis of the period of the reception signals, that is, the period of the chirps, and if the relative velocity of the target exceeds the detection velocity range, velocity aliasing occurs, and thus it is impossible to correctly perform velocity measurement. The reason is that, since Doppler frequencies are sampled at the period of the chirps, if one period of the Doppler frequencies becomes less than twice the period of the chirps, Doppler frequencies are not correctly sampled, and are detected as aliasing signals (aliasing).

Also, since the FCM system repeats the FFT process for obtaining the distance as described above, according to the number of chirps, and repeats the FFT process for obtaining the relative velocity, according to the number of range bins, computation load is too high.

SUMMARY

Therefore, a first object of the present invention is to provide a technology related to a radar device and making it possible to detect accurate relative velocity even in a case where aliasing of relative velocity has occurred, and expand a detection velocity range. Also, a second object of the present invention is to provide a technology related to a radar device and capable of reducing an amount of computation during computation of the relative velocity between a target and the radar device.

In order to accomplish the above objects, according to a first aspect of the embodiments of the present invention, there is provided a radar device comprising: a transmitting unit configured to transmit, at least, a first transmission signal generated on the basis of a first parameter for computing a relative velocity in a first detection velocity range, and a second transmission signal generated on the basis of a second parameter for computing a relative velocity in a second detection velocity range narrower than the first detection velocity range; a receiving unit configured to receive the reflected wave of the first transmission signal from a target, as a first reception signal, and receive the reflected wave of the second transmission signal from the target, as a second reception signal; and a velocity measuring unit configured to compute a first relative velocity in the first detection velocity range on the basis of the first reception signal, and compute a second relative velocity in the second detection velocity range on the basis of the second reception signal, and obtain the velocity measurement result of the relative velocity of the target on the basis of the combination of the first relative velocity and the second relative velocity.

According to a second aspect of the embodiments of the present invention, there is provided a signal processing device for a radar device comprising a velocity measuring unit configured to receive, at least, the reflected wave of a first transmission signal from a target and the reflected wave of a second transmission signal from the target, as a first reception signal and a second reception signal, respectively, and compute a first relative velocity in a first detection velocity range on the basis of the first reception signal, and compute a second relative velocity in a second detection velocity range on the basis of the second reception signal, and obtain the relative velocity of the target on the basis of the combination of the first relative velocity and the second relative velocity, the first transmission signal being generated on the basis of a first parameter for computing a relative velocity in the first detection velocity range, and the second transmission signal being generated on the basis of a second parameter for computing a relative velocity in the second detection velocity range narrower than the first detection velocity range.

According to a third aspect of the embodiments of the present invention, there is provided a velocity measuring method of a radar device comprising: transmitting, at least, a first transmission signal generated on the basis of a first parameter for computing a relative velocity in a first detection velocity range, and a second transmission signal generated on the basis of a second parameter for computing a relative velocity in a second detection velocity range narrower than the first detection velocity range; receiving the reflected wave of the first transmission signal from a target, as a first reception signal, and receiving the reflected wave of the second transmission signal from the target, as a second reception signal; and computing a first relative velocity in the detection relative velocity range on the basis of the first reception signal, and computing a second relative velocity in the second detection velocity range on the basis of the second reception signal, and obtaining the velocity measurement result of the relative velocity of the target on the basis of the combination of the first relative velocity and the second relative velocity.

Also, the present invention may be a program for implementing the processes which are performed in the above described radar device. Further, the present invention may be a computer-readable recording medium retaining that program. In this case, it is possible to make a computer or the like read and execute the program of the recording medium, thereby providing the functions of the program. Here, the term "computer-readable recording medium" means a recording medium in which information such as data and programs can be accumulated electrically, magnetically, optically, mechanically, or chemically, and from which the information can be read by a computer or the like.

According to the present invention, it is possible to provide a technology related to a radar device and making it possible to detect accurate relative velocity even in a case where aliasing of relative velocity has occurred, and expand a detection velocity range. Also, according to the invention, it is possible to provide a technology related to a radar device and capable of reducing an amount of computation during computation of the relative velocity between a target and the radar device.

BRIEF DESCRIPTION OF THE DRAWINGS

Exemplary embodiments of the present invention will be described in detailed based on the following figures, wherein:

FIG. 1 is an explanatory view of an FCM system;

FIG. 20 is a view illustrating a process procedure in a case of performing measurement on the basis of the basic parameter, as a comparative example;

DETAILED DESCRIPTION

Figure 2:
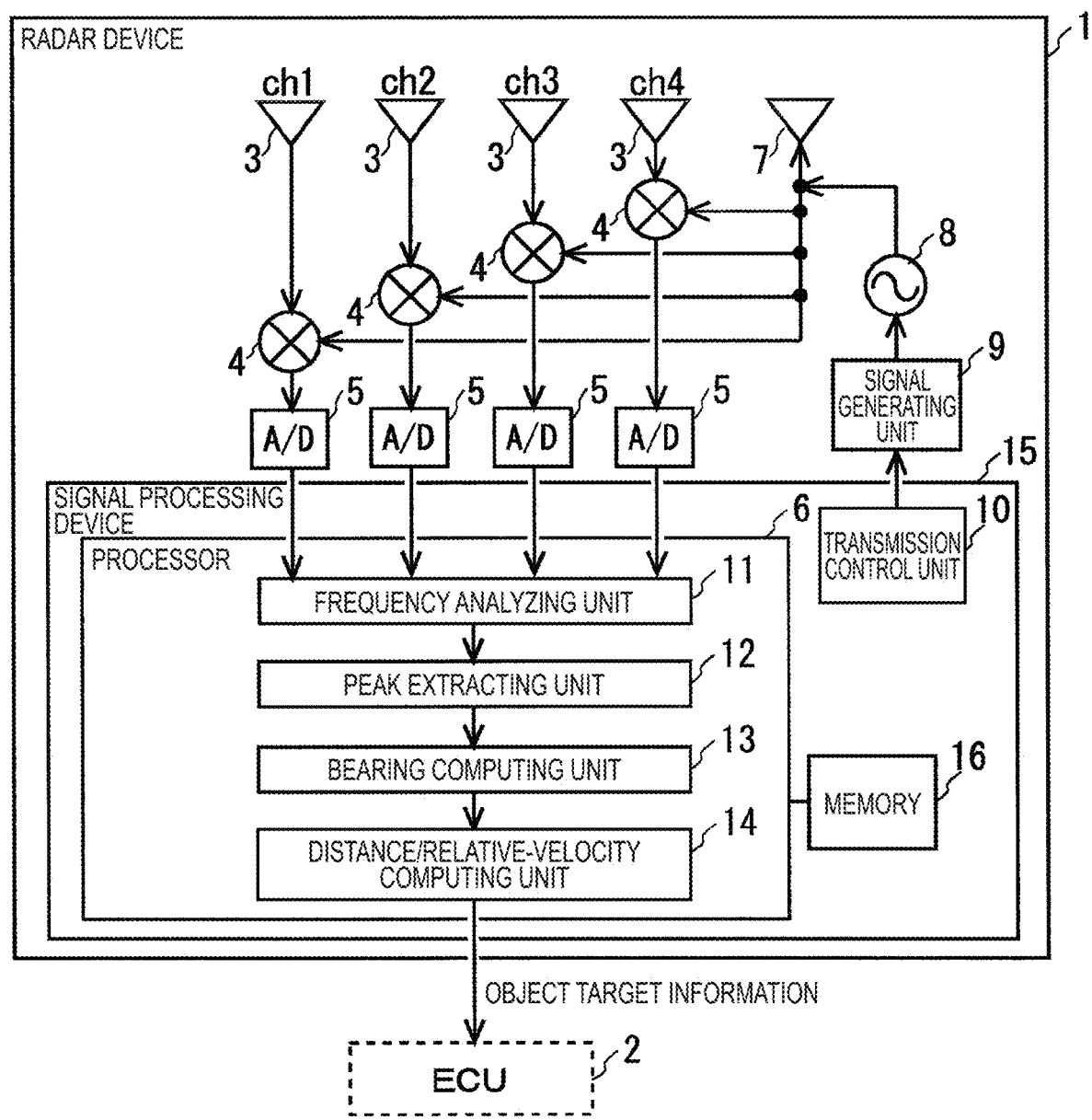
FIG. 2 is a configuration diagram of a radar device.

Hereinafter, embodiments of a radar device of the present invention will be described on the basis of the accompanying drawings. FIG. 1 is an explanatory view of an FCM system, and FIG. 2 is a configuration diagram of a radar device 1 according to the embodiments. The radar device 1 according to the embodiments can be mounted on a vehicle and be used to detect targets existing around the vehicle, such as other vehicles, signs, and guard rails. The result of target detection can be output to some components of the vehicle, such as a storage unit and an electrical control unit (ECU), and be used in, for example, a pre-crash safety system (PCS) to control the vehicle. However, the radar device 1 according to the embodiments may be used for various uses (such as monitoring of flying aircrafts and sailing vessels) other than an in-vehicle radar device.

First Embodiment (Configuration of Device)

The radar device 1 includes a transmitting antenna 7, an oscillator 8, and a signal generating unit 9. Also, the radar device 1 includes receiving antennae 3 (ch1 to ch4) arranged at regular intervals, mixers 4 (ch1 to ch4) connected to the receiving antennae 3, respectively, A/D (Analog to Digital) converters 5 (ch1 to ch4) connected to the mixers 4, respectively, and a signal processing device 15 configured to process data of the A/D converters 5.

Alternatively, the radar device 1 may include a receiving circuit dedicated for each receiving antenna, or may be include a receiving circuit configured to collectively receive reception signals of all receiving antennae. In this case, control for performing switching on the receiving antennae is required such that the receiving antennae sequentially correspond to the receiving circuit in a time division manner; however, it is possible to make the circuit configuration of the radar device 1 compact. In the present embodiment, a receiving antenna 3, a mixers 4, and an A/D converter 5 constitute one form of a receiving unit. In FIG. 2, an example having four receiving units is shown. However, the number of receiving units is not limited thereto, and may be arbitrarily set according to required performance and the like. Also, the number of transmitting units is not limited to one, and the radar device may include a plurality of transmitting units. For example, in a case of transmitting a plurality of transmission signals on the basis of a plurality of parameters, the radar device may have transmitting units configured to transmit transmission signals based on the individual parameters, respectively.

The radar device 1 of the present embodiment uses an FCM (Fast Chirp Modulation) system, and a method of computing distance and relative velocity in the FCM system will be first described in brief. The radar device 1 generates a transmission signal (chirps) ST in which the frequency varies like a saw-tooth wave as shown in (A) of FIG. 1 by the signal generating unit 9, and modulates the transmission signal by the oscillator 8, and transmits the transmission signal through the transmitting antenna 7. In FIG. 1, a symbol "Tm" is the period of the transmission signal ST which is generated by the signal generating unit 9, and is, for example, 10 μs to 50 μs. Also, one chirp (the waveform of one period) of the transmission signal ST has a saw-tooth shape in which the frequency increases with an inclination θ from a reference frequency f0 with time, and almost vertically returns to the reference frequency f0 if reaching a maximum value f1. However, the transmission signal ST may be generated such that the waveform of each period has a reverse saw-tooth shape in which the frequency almost vertically increases to the maximum value f1, and then decreases to the reference frequency f0 with the inclination θ with time. The radar device 1 consecutively transmits a plurality of chirps determined on the basis of a desired detection velocity range and a desired velocity resolution, that is, requirement specifications for radar performance, and transmits a predetermined number of chirps for one scan. Especially, the radar device 1 of the present embodiment transmits a plurality of chirps determined on the basis of a plurality of parameters as will be described, for one scan.

Thereafter, the radar device 1 receives reflected waves from a target, as reception signals SR, through the receiving antennae 3. The mixers 4 (ch1 to ch4) mix the reception signals SR with portions of the transmission signal ST, and computes the absolute values of the differences between the transmission signal ST and the reception signals SR, thereby generating beat signals SB as shown in (B) of FIG. 1. The beat signals SB are generated for each period (shown by Tm) of the transmission signal shown in (A) of FIG. 1. In this case, since the time (delay time) from when the transmission signal ST shown in (A) of FIG. 1 is transmitted to when the reflected wave of the transmission signal from the target is received as a reception signal SR varies in proportion to the distance between the target and the radar device, the frequency of each beat signal SB (for example, B1) is proportional to the distance. Therefore, if an FFT (Fast Fourier Transform) is performed is performed on each beat signal SB, a peak appears at the position of a frequency corresponding to the distances of the target. Also, since an FFT can extract a reception level and phase information at each of frequency points (hereinafter, also referred to as range bins) set at intervals of a predetermined frequency, accurately, a peak appears at the range bin of a frequency corresponding to the distance of the target. Therefore, it is possible to obtain the distance to the target by detecting the peak frequency.

Now, relative velocity computation will be described. In a case where there is a relative velocity between the vehicle and the target, the FCM system detects a Doppler frequency between the beat signals, using phase change attributable to the Doppler frequency, thereby computing the relative velocity. In other words, if the relative velocity is 0, since there is no Doppler component between the reception signals, all of the phases of the reception signals related to the individual chirps become same. Meanwhile, in a case where there is a relative velocity between the vehicle and the target, a Doppler phase change occurs between the reception signals related to the individual chirps. Since peak information obtained by performing an FFT process on the beat signals includes such phase information, if the peak information of the same target obtained from the individual beat signals is arranged in time series, and a second FFT is performed, the Doppler frequency is obtained from the phase information, and a peak appears at the position of the obtained frequency. This FFT process extracts phase information for each of frequency points (hereinafter, also referred to as velocity bins) set at intervals of a predetermined frequency according to velocity resolution, and thus the peak appears at the velocity bin of a frequency corresponding to the relative velocity of the target. Therefore, it is possible to obtain the relative velocity of the target by detecting the peak frequency.

The A/D converters 5 (ch1 to ch4) acquire the beat signals SB from the mixers 4 (ch1 to ch4), respectively, and perform sampling on the beat signals SB which are analog signals, at a predetermined frequency, thereby converting the beat signals into digital signals. In the FCM system, since chirps having a period shorter than that in the FMCW system, the A/D converters 5 faster than those in the FMCW system are used.

The signal processing device 15 is a so-called computer having a processor 6 configured to perform arithmetic processing on signals according to a computer program, and a memory 16 for storing information related to arithmetic processing. The memory 16 may be composed of a plurality of memories, such as an auxiliary storage unit for storing the computer program and setting values and a main storage unit for temporarily storing information to be used in arithmetic processing. If electric power is supplied to the vehicle, the processor 6 executes the computer program, whereby the signal processing device 15 implements function units such as a transmission control unit 10, a frequency analyzing unit 11, a peak extracting unit 12, a bearing computing unit 13, and a distance/relative-velocity computing unit 14. For example, the transmission control unit 10 controls the signal generating unit 9 such that the signal generating unit generates a transmission signal on the basis of a plurality of preset parameters (individual parameters to be described below), and outputs the transmission signal. In the present embodiment, the transmission control unit 10, the signal generating unit 9, the oscillator 8, and the transmitting antenna 7 constitute one form of a transmitting unit. This transmitting unit transmits, at least, a first transmission signal generated on the basis of a first parameter for computing relative velocity in a first relative velocity range, and a second transmission signal generated on the basis of a second parameter for computing relative velocity in a second relative velocity range narrower than the first relative velocity range. Then, the first transmission signal is reflected from the target, and the receiving units (the receiving antennae 3, the mixers 4, and the A/D converters 5) receive the reflected waves as first reception signals. Also, the second transmission signal is reflected from the target, and the receiving units receive the reflected waves as second reception signals.

Since the reflected waves from the target are superimposed and received as a reception signal SR, the frequency analyzing unit 11 performs a process of separating a high-frequency component based on each reflected wave from the target, from beat signals SB generated on the basis of the reception signal SR. For example, the frequency analyzing unit 11 performs an FFT process on the beat signals SB, thereby obtaining the process result for each of the range bins set at intervals of the predetermined frequency. Hereinafter, an FFT process for obtaining a process result for each range bin will also be referred to as an FFT process of a range bin direction. Further, the frequency analyzing unit 11 performs an FFT process on the process results of the FFT process of the range bin direction, for each of range bins common to the plurality of beat signals, thereby obtaining the process result for each of velocity bins set at intervals of the predetermined frequency. Hereinafter, an FFT process for obtaining a process result for each velocity bin will also be referred to as an FFT process of a velocity bin direction. In the present embodiment, as an example of a frequency analyzing process which is performed by the frequency analyzing unit 11, Fourier transform, particularly, fast Fourier transform is shown. However, the present invention is not limited thereto. As long as it is possible to obtain a frequency according to the distance between the vehicle and each target, and a frequency according to the relative velocity of each target, other frequency analyzing algorithm such as wavelet conversion may be used. The peak extracting unit 12 detects individual peaks from the result of the FFT process of the range bin direction and the result of the FFT process of the velocity bin direction. The bearing computing unit 13 measures the bearing of each target on the basis of the reception signals received through the receiving antennae 3 (ch1 to ch4). The distance/relative-velocity computing unit 14 obtains a distance and a relative velocity corresponding to each peak detected by the peak extracting unit 12. The distance/relative-velocity computing unit 14 detects the frequency of each peak generated by the FFT process of the range bin direction, that is, a range bin at which a peak according to the distance between each target and the vehicle has been generated, thereby obtaining the distance to the corresponding target. Also, the distance/relative-velocity computing unit 14 detects the frequency of each peak generated by the FFT process of the velocity bin direction, that is, a velocity bin at which a peak according to the relative velocity of each target has been generated, thereby obtaining the relative velocity of the corresponding target. Especially, the distance/relative-velocity computing unit 14 of the present embodiment computes a first relative velocity in the first relative velocity range on the basis of a first reception signal, and computes a second relative velocity in the second relative velocity range on the basis of a second reception signal, and obtains the velocity measurement result of the relative velocity of a target on the basis of the combination of the first relative velocity and the second relative velocity. In the present embodiment, the distance/relative-velocity computing unit 14 is one form of a velocity measuring unit and a distance measuring unit.

The signal processing device 15 is configured, for example, as a micro control unit (MCU). However, the present invention is not limited thereto. As long as it is possible to implement the functions of the individual function units 10 to 14, any other configuration can be used. Also, the processor 6 executes the computer program in cooperation with the memory 16, whereby the individual function units 10 to 14 are implemented. However, for convenience of explanation, in FIG. 2, the individual function units are shown in the processor 6. Also, these function units are not limited to components which the general-purpose processor 6 implements on the basis of the computer program (software). For example, all or some of the function units may be implemented by a dedicated arithmetic circuit (hardware) disposed inside or outside the processor 6.

(Measuring Method)

Hereinafter, a process flow which the processor 6 performs in a case where electric power is supplied from the vehicle to the radar device 1 will be described with reference to the flow chart of FIG. 5. In a case where the driving source of the vehicle is operating, for example, if the driving source is an internal combustion engine, in a case where an ignition switch is in an ON state, or if the driving source is a hybrid system or an EV (electric vehicle) system, in a case where the power of the system is in an ON state, the processor 6 repeats the following process flow.

In STEP S205, the processor 6 instructs the signal generating unit 9 to generate and output a transmission signal ST according to a parameter preset depending on the requirement specifications of the radar device 1. For example, the number M of chirps necessary for performing velocity measurement in a predetermined detection velocity range at a predetermined velocity resolution is the same as the number $N_V$ of velocity bins, and is determined by Expression 1.

$$M = N_V = 2 * V\text{max}/V\text{min} \quad (1)$$

Also, in the present embodiment, in order to perform an FFT process, the number of bins is an integer. Therefore, the number M of chirps is also an integer.

Also, since the period Tm (FIG. 1) of the transmission signal ST (chirps) is determined according to a velocity resolution, and the inclination θ of the transmission signal ST is determined according to a detection velocity range, the number M of chirps, the period Tm, and the inclination θ are set in advance. Especially, in the present embodiment, on the basis of each of a first parameter and a second parameter, the number $M^P$ of chirps, the period $Tm^P$, and the inclination $\theta^P$ are set, and the processor 6 instructs the signal generating unit 9 to generate the transmission signal ST on the basis of the settings of them. Also, in the setting values $M^P$, $Tm^P$, and $\theta^P$, P is a symbol representing a parameter. Specifically, the setting values based on the first parameter are represented by $M^1$, $Tm^1$, and $\theta^1$, and the setting values based on the second parameter are represented by $M^2$, $Tm^2$, and $\theta^2$. If the transmission signal ST generated on the basis of the instruction of the processor is transmitted, and reflected waves from targets are received as a reception signal SR, beat signals are generated from the transmission signal ST and the reception signal SR, and the A/D converters 5 (ch1 to ch4) perform A/D conversion on the beat signals SB.

Figure 3:
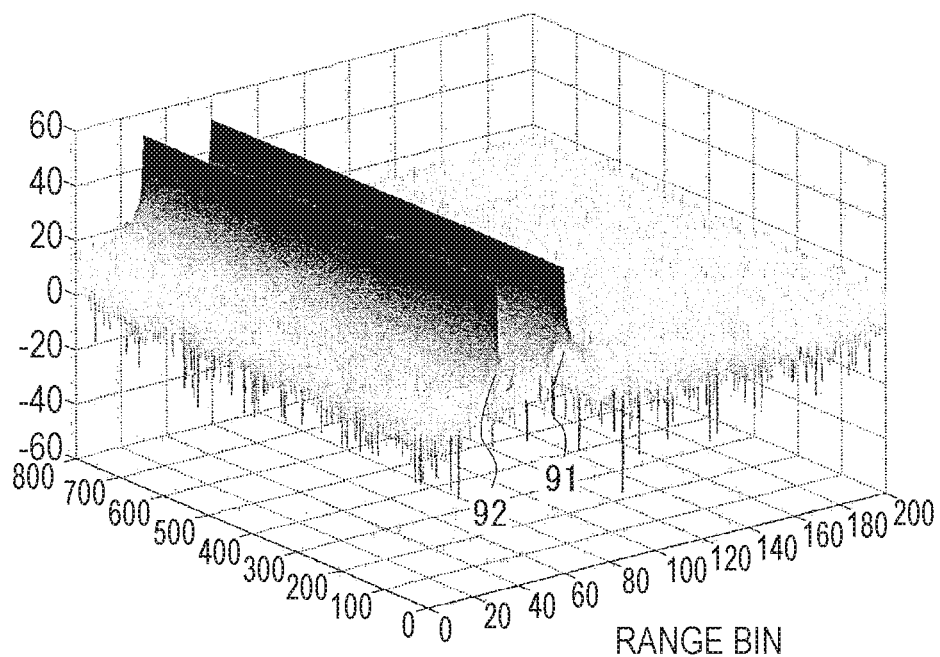
FIG. 3 is a view illustrating a result of a Fourier transform process of a range bin direction.

The processor 6 acquires the signals obtained by performing A/D conversion in the A/D converters 5 (ch1 to ch4), in STEP S210, and performs an FFT process on the acquired signals in STEP S220. The processor 6 repeats the FFT process of STEP S220 on each of the beat signals B1 to BM, that is, the processor repeats the FFT process until the number $M^P$ of FFT processes reaches the number of beat signals B1 to BM (the number of chirps) (STEP S230). For explanation, (C) of FIG. 1 shows a matrix pattern in which values R1 to RJ obtained at intervals of a predetermined frequency as the result BF1 of the FFT process of the beat signal B1 are arranged at the range bins RA1 to RAJ of corresponding frequencies, and the results BF2 to BFM of the FFT processes of the individual beat signals B2 to BM are arranged in the direction perpendicular to the range bins. FIG. 3 shows an example in which the results of Fourier transform processes of the range bin direction are arranged on a plane as described above and which represents the value (spectrum (dB)) of each individual process results in a height direction. However, this matrix arrangement is for convenience of explanation, and is not limited to a case where the result values are physically stored in that arrangement.

Subsequently, in STEP S240, the processor 6 performs an FFT process on the result of the Fourier transform process of the range bin direction at regular distance intervals, that is, for each range bin. The processor 6 repeats the FFT process of STEP S240 until the number of times the FFT process has been performed reaches a predetermined number $N^P$ of times, that is, the number $N_R^P$ of range bins (STEP S250). Therefore, if it is determined that the number of FFT processes is not $N^P$ ("No" in STEP S250), the processor returns to STEP S240; whereas if it is determined that the number of FFT processes is $N^P$ ("Yes" in STEP S250), the processor proceeds to STEP S260.

Figure 4:
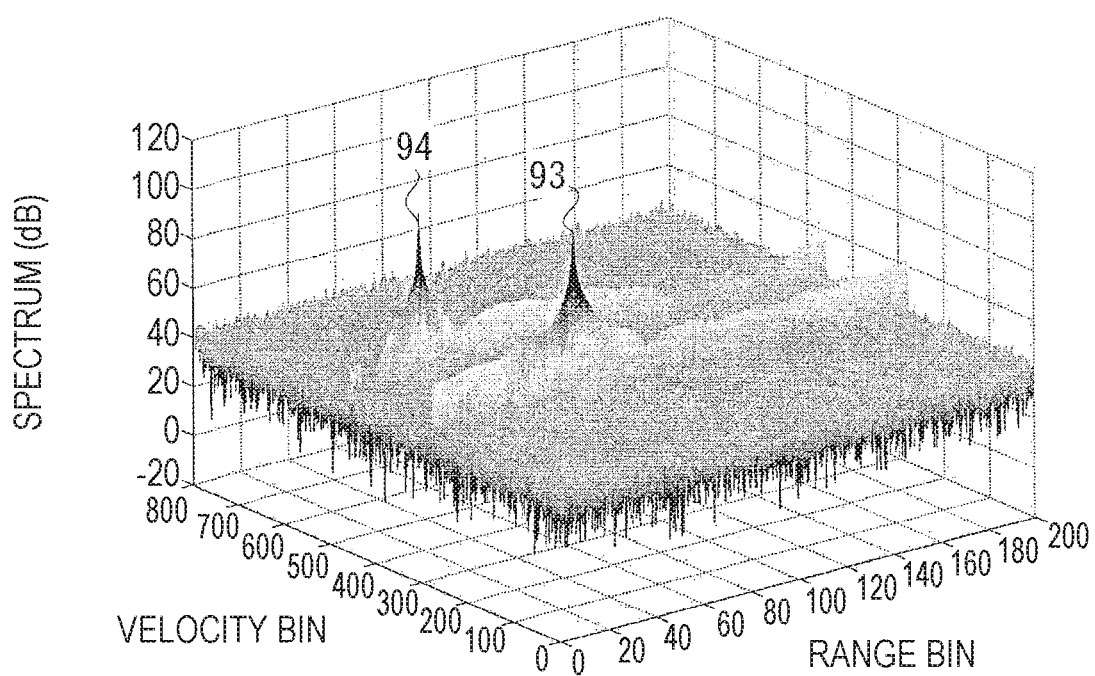
FIG. 4 is a view illustrating a result obtained by performing a Fourier transform process of a velocity bin direction on the result of FIG. 3, that is, a result of a two-dimensional FFT process.

If the results of the FFT processes of the velocity bin direction are arranged in a matrix of the range bin direction and the velocity bin direction as shown in FIG. 3, and the values of the process results are taken in the height direction, peaks according to relative velocities are obtained as shown in FIG. 4.

In STEP S260, the processor 6 detects each peak from the process results of STEP S240, and obtains the distance and relative velocity of the target on the basis of the peak. If the FFT process of the range bin direction is performed on each beat signal in STEP S220, since the distance-dependent component of the target is converted into a frequency, and appears as a peak, the processor detects the peak, and obtains the distance between the vehicle and the target on the basis of the bin at which the peak has been generated.

Also, if the FFT process of the velocity bin direction is further performed on the results of the FFT processes of the range bin direction in STEP S240, peaks appear at frequencies according to phase changes attributable to the relative velocities of targets, and the processor detects the peaks, and obtains the relative distances between the vehicle and the targets on the basis of the bins at which the peaks have been generated. In other words, in the example of FIG. 4, two peaks 93 and 94 are generated. Therefore, on the basis of the positions of the range bins at which the peaks 93 and 94 have been generated, the distances of two targets from the vehicle are obtained, respectively, and on the basis of the positions of the velocity bins at which the peaks 93 and 94 have been generated, the relative velocities of the two targets to the vehicle are obtained, respectively.

Figure 5:
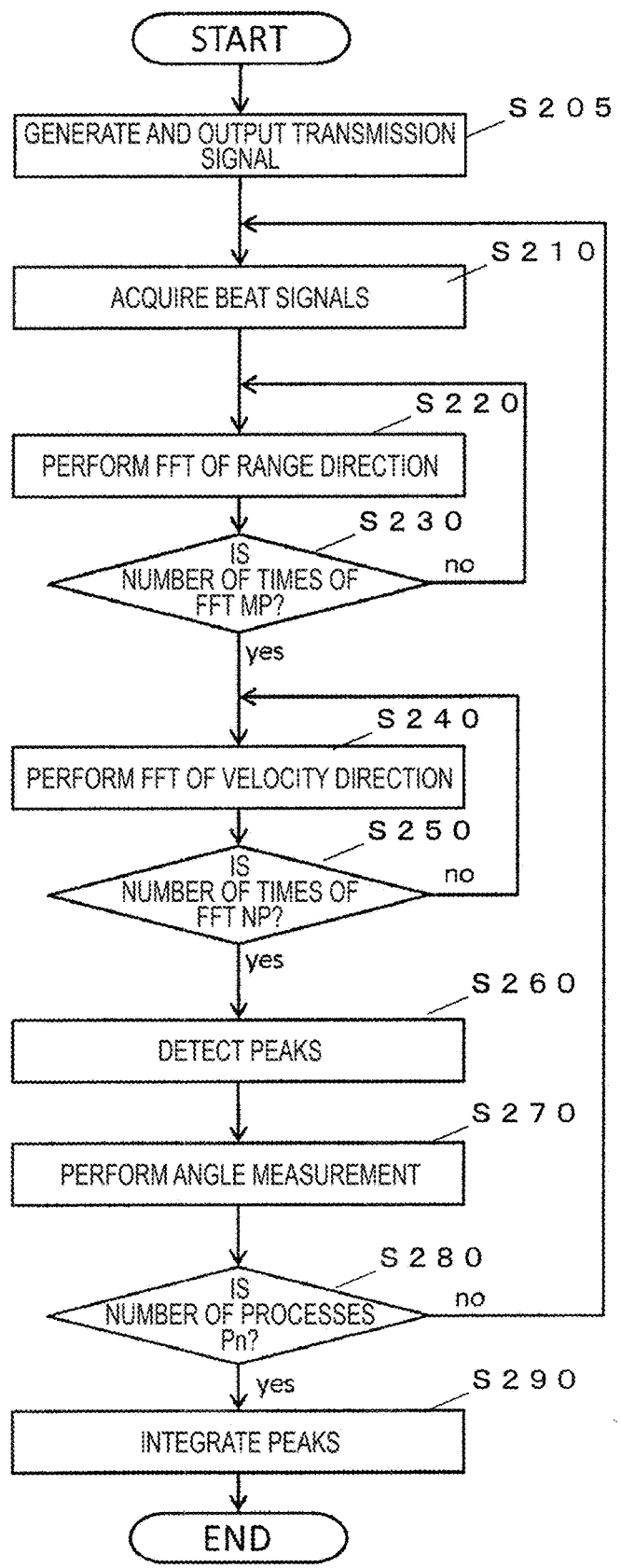
FIG. 5 is a flow chart of signal processing.

Also, although not shown in FIG. 5 for convenience of explanation, on each of the beat signals generated from the reception signals SR received by the plurality of receiving antennae 3 (ch1 to ch4), the processes of STEPS S210 to S260, that is, the processes of acquiring the beat signal generated from the reception signals SR, and detecting each peak, and obtaining a distance and a relative velocity are performed. Since the plurality of receiving antennae 3 (ch1 to ch4) are disposed at predetermined intervals, if the processor 6 obtains peaks on the basis of the individual reception signals SR received from the same target by the individual receiving antennae 3 (ch1 to ch4), due to the positional relation between the individual receiving antennae 3 (ch1 to ch4) and the target, the phases of the individual peaks are different. For this reason, in STEP S270, from such phase differences, the processor obtains the angle of the target, that is, the bearing of the target with respect to the radar device 1. A specific algorithm for measuring the angle may be a known algorithm, and a detailed description thereof will not be made.

Also, although the system for obtaining the angle on the basis of the differences of the reception signals SR received by the plurality of receiving antennae 3 (ch1 to ch4) is described in the present embodiment, the system for obtaining the angle is not limited thereto, and any other system may be used. For example, it is possible to use a system for physically changing the direction of the transmitting antenna or control the transmission direction of a transmission signal of an array antenna or the like, thereby sequentially changing the transmission direction of the transmission signal, and specifying the bearing of each target on the basis of the transmission direction of the transmission signal during reception of a reflected wave from the target.

Subsequently, in STEP S280, the processor 6 determines whether computation based on every individual parameter has finished. For example, in a case where the process of STEP S270 based on a set of individual parameters has finished, the processor determines that the process based on the individual corresponding parameters has finished, and counts up the number of processes. Then, if the number of processes is not a predetermined number of times Pn, the processor determines that computation based on every individual parameter has not finished ("No" in STEP S280), and returns to STEP S210, and repeats the process (STEPS S210 to S280) based on an unprocessed individual parameter. Meanwhile, if the number of processes is the predetermined number (the number of individual parameters) Pn, the processor determines that computation based on every individual parameter has finished. For example, with respect to two individual parameters, that is, a first parameter and a second parameter, if the number of processes becomes 2, the processor determines that computation based on every individual parameter has finished. In a case of determining that computation based on every individual parameter has finished ("Yes" in STEP S280), the processor 6 proceeds to STEP S290 in which the processor integrates velocity measurement results based on the individual parameters, thereby obtaining the relative velocity between the vehicle and the target. For example, in a case where a plurality of peaks is detected on the basis of the results of the FFT processes of the individual parameters as shown in FIG. 4, the processor specifies a common peak on the basis of the distances and bearings of the peaks, and computes relative velocities on the basis of the plurality of individual parameters at the common peak, and obtains the velocity measurement result of the relative velocity between the vehicle and the target on the basis of the combination of the computed relative velocities. A specific method of obtaining such a measurement result will be described below.

Also, in the example of FIG. 5, the processor performs an FFT process of the range direction in STEPS S220 and S230, and then performs an FFT process of the velocity direction in STEPS S240 and S250. However, the present invention is not limited thereto. It is also possible to first perform an FFT process of the velocity direction, and then perform an FFT process of the range direction.

(Velocity Aliasing)

As described above, in the FCM system, velocity measurement is performed by performing an FFT process on the phase change between the reception signals SR received consecutively. At this time, if the relative velocity of the target exceeds the detection velocity range, velocity aliasing occurs, and the relative velocity is falsely detected as a velocity in the detection velocity range. The reason is that, since velocity measurement is performed on the basis of the phase change between the reception signals SR, a Doppler frequency is sampled at the period of the reception signals SR, that is the period of chirps, and twice the period of chirps becomes the upper limit of detection velocity by the sampling theorem, and if one period of the Doppler frequency becomes less than twice the period of chirps, the Doppler frequency cannot be correctly sampled, and is detected as an alias signal (aliasing).

Figure 6:
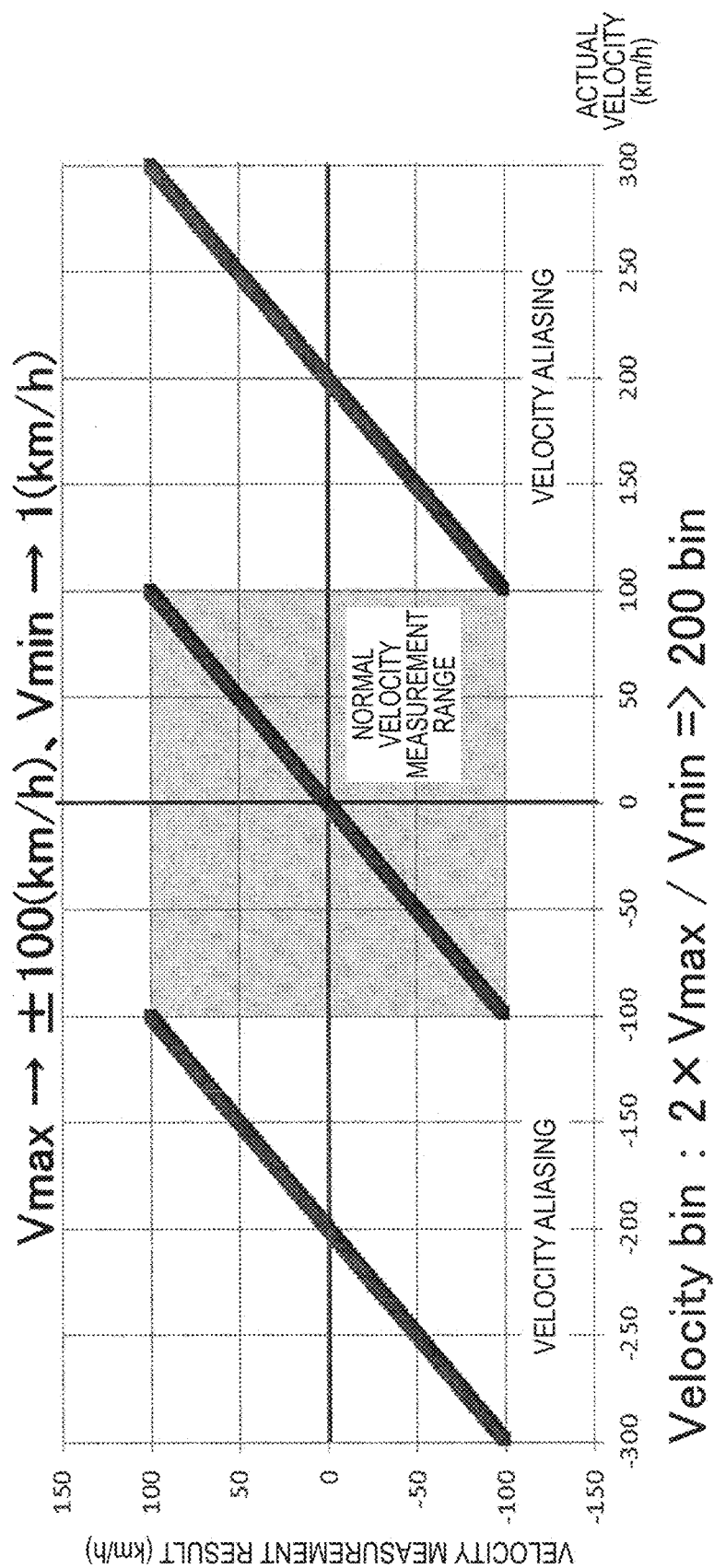
FIG. 6 is an explanatory view of velocity aliasing.

FIG. 6 is an explanatory view of velocity aliasing, and shows a graph illustrating the relation between actual relative velocities and velocity measurement results in a case where the detection velocity range Vmax is 100 km/h. In the graph of FIG. 6, actual relative velocities are shown on the transverse axis, and velocity measurement results are shown on the longitudinal axis, and a shaded portion represents a range in which the velocity measurement results are equal to the actual relative velocities, that is, a range in which velocity aliasing does not occur, and the other portions represent ranges in which velocity aliasing occurs.

In the range from −99 km/h to 100 km/h, the velocity measurement results are equal to the actual relative velocities, like a case where an actual relative velocity is −50 km/h and a velocity measurement result also is −50 km/h, and a case where an actual relative velocity is 0 km/h and a velocity measurement result also is 0 km/h. In other words, velocity measurement results based on bins at which peaks have been generated are equal to actual relative velocities. However, if an actual relative velocity exceeds the detection velocity range Vmax, a peak based on the actual relative velocity appears at the bin of an aliasing position in the detection velocity range, and thus a velocity which is not equal to the actual relative velocity is falsely detected as a velocity measurement result. For example, in a case where an actual relative velocity is −250 km/h, −50 km/h is falsely detected as a velocity measurement result, and in a case where an actual relative velocity is 300 km/h, 100 km/h is falsely detected as a velocity measurement result.

If an actual relative velocity is $V_R$, and a velocity measurement result is $V_{FFT}$, when $V_R$ is in a range larger than (−Vmax+Vmin) and equal to or less than Vmax (in FIG. 6, when $V_R$ is in the range larger than −99 km/h and equal to or less than 100 km/h), $V_R$ and $V_{FFT}$ become equal to each other. However, as described above, when an actual relative velocity is out of that range, a relative velocity in the detection velocity range is falsely detected, and the relation between $V_R$ and $V_{FFT}$ is expressed as Expression 2.

$$V_{FFT}=((V_R+V\max-V\min)\bmod M)-V\max+V\min \quad (2)$$

Expression 2 is satisfied when the velocity resolution of the desired velocity measurement performance is equal to or greater than Vmin. Also, relative velocities $V_{CN}$ (wherein N is an integer of 1 or greater) which may be an actual relative velocity including aliasing when a velocity measurement result is $V_{FFT}$ are expressed as the flowing Expression.

$$V_{CN}=V_{FFT}\pm 2\times N\times V\max \text{ (wherein } N \text{ is an integer of 1 or greater)} \quad (3)$$

As described above, if an actual relative velocity exceeds the detection velocity range Vmax, velocity aliasing occurs, and thus it is necessary to highly set the requirement specifications of the radar device 1, that is, to widely set the detection velocity range Vmax, with respect relative velocities which can be detected as the relative velocity of the target. However, in order to widely set the detection velocity range Vmax, there are restrictions on design. For example, it is necessary to set the period of chirps short, and the A/D converters 5 needs to be fast. Therefore, it is not possible to widely set the detection velocity range Vmax without any limit. For this reason, in the present embodiment, the relative velocity of a target is computed on the basis of each of a plurality of individual parameters, and the computed relative velocities are combined, whereby the velocity measurement result of the relative velocity of the target is obtained. Therefore, even in a case where the actual relative velocity of the target has exceeded the detection velocity range of each individual parameter, whereby velocity aliasing has occurred, an accurate value is obtained as the velocity measurement result.

(Example of Velocity Measurement Based on Individual Parameters)

Now, an example in which the relative velocity of a target is obtained by integrating the results of velocity measurement based on a plurality of individual parameters will be described. The number of each individual parameter is represented by P (wherein P is an integer between 1 and PL), and values related to each parameter are marked with a superscript "P". Also, a parameter related to desired velocity measurement performance (required performance) is marked with a superscript "S". In this case, a velocity measurement result based on each parameter is $V^P_{FFT}$, and Expression 2 is satisfied only in a case where $V^P$min is not smaller than Vmin. In a case where $V^P$min is smaller than $V^P$min, $V^P_{FFT}$ is expressed as Expression 4. Expression 4 is obtained by generalizing Expression 1.

If relative velocities which may be actual relative velocities including aliasing and are computed from the velocity measurement results based on each individual parameter are $V^P_{CNP}$ $$V^P_{FFT}=\left\{\left[\left(\operatorname{ceil}\left(\frac{V_R-\operatorname{ceil}(V\max/2)+1}{V\min}\right)+\operatorname{ceil}\left(\frac{M}{2}\right)-1\right)\bmod M\right]-\operatorname{ceil}\left(\frac{M}{2}\right)\right\}*V\min \quad (4)$$

(wherein NP is an integer of 1 or greater), and the set of them is $V^P_C$, the relation therebetween is expressed as Expression 5.

$$V^P_{CN}=V^P_{FFT}\pm 2\times N\times V^P\max \text{ (wherein } N \text{ is an integer of 1 or greater)} \quad (5)$$

Expression 5 is satisfied only in a case where $V^S$min is not smaller than $V^P$min. In a case where $V^S$min is smaller than $V^P$min, $V^P_{CN}$ is expressed as Expression 6. Expression 6 is obtained by generalizing Expression 2. In this case, N represents the number of times of aliasing, and W represents the width of $V^P$min having $V^S$min as a reference.

$$V^P_{CN}=V^P_{FFT}\pm 2*N*V^P\max+W*V^S_{min}(N:1,2,3,\ldots) \quad (6)$$

$$\left(W:\operatorname{ceil}\left(-\frac{V^P_{min}}{2}\right)\leq W\leq \operatorname{ceil}\left(\frac{V^P_{min}}{2}\right)-1\right)$$

Also, in a case where a relative velocity $V^P_{CN}$ is common to the individual parameters, $$V_R=V_{CN^1}^1\cap V_{CN^2}^2\cap\ldots\cap V_{CN^{PL}}^{PL}(N^P:1,2,3,\ldots) \quad (7)$$

since $V^P_{CN}$ is equal to $V_R$, it is possible to compute $V_R$. In this case, $V_R$ is expressed as Expression 7.

Here, the detection velocity range Vmax of an integration result becomes the least common multiple of the detection velocity ranges $V^P$max of the individual parameters. Also, in a case where the velocity resolutions $V^P$min of the parameters are different, the minimum velocity resolution $V^P$min becomes the velocity resolution Vmin of the integration result. If a $$V_{max}^F=\operatorname{LCM}(V_{max}^1,V_{max}^2,\ldots,V_{max}^{PL}) \quad (8)$$

$$V_{min}^F=\min(V_{min}^1,V_{min}^2,\ldots,V_{min}^{PL}) \quad (9)$$

parameter related to the integration result of the individual parameters is marked with a subscript "F", it can be expressed as Expression 8 and Expression 9.

If the individual parameters are set such that $V^S$max is not larger than $V^F$max and $V^S$min is not smaller than $V^F$min, it is possible to reduce M while satisfying the desired velocity measurement performance.

Figure 7:
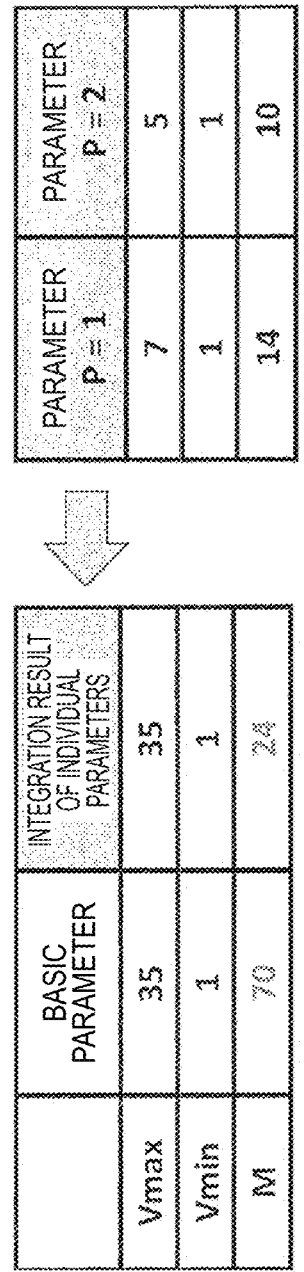
FIG. 7 is an explanatory view of parameters.
Figure 8:
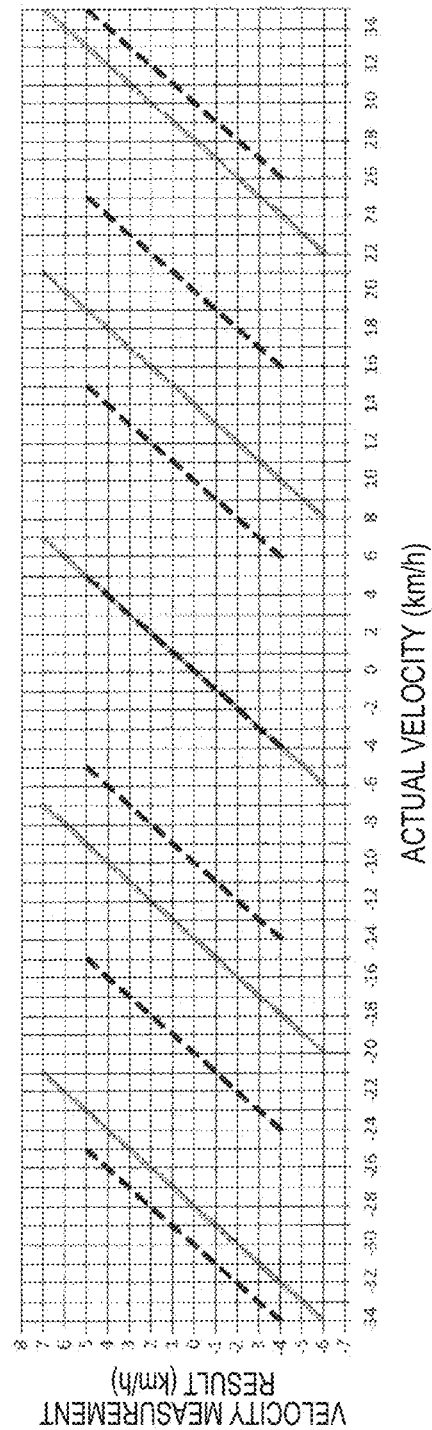
FIG. 8 is a view illustrating the relation between actual velocities and velocity measurement results based on the parameters of FIG. 7.

An example in which a first parameter and a second parameter are set as individual parameters, and the relative velocity (integral relative velocity) of a target is computed on the basis of each of the parameters, and the computed relative velocities are combined, whereby the velocity measurement result of the relative velocity of the target is obtained will be shown. FIG. 7 is a view illustrating examples of the first parameter and the second parameter, and FIG. 8 is a view illustrating the relation between velocity measurement results and actual velocities based on the parameters of FIG. 7. In the examples of FIG. 7, a parameter satisfying desired velocity measurement performance is referred to as a basic parameter, and $V^S$max and $V^S$min are set to 35 km/h and 1 km/h, respectively. The values of the basic parameter are references of detection velocity ranges Vmax and velocity resolutions Vmin, and satisfy the required performance of the radar device 1. In contrast, the detection velocity range $V^1$max and the velocity resolution $V^1$min of the first parameter are set to 7 km/h and 1 km/h, respectively, and the detection velocity range $V^2$max and the velocity resolution $V^2$ min of the second parameter are set to 5 km/h and of 1 km/h, respectively. In other words, the second relative velocity range $V^2$max is set to be narrower than the first relative velocity range $V^1$max. Also, the detection velocity range $V^1$max of the first parameter and the detection velocity range $V^2$max of the second parameter are set such that the least common multiple of them becomes 35 equal to the value of the detection velocity range $V^S$max of the basic parameter.

If an actual relative velocity $V_R$ is 13, a first relative velocity $V^1_{FFT}$ becomes −1 and a second relative velocity $V^2_{FFT}$ becomes 3. In this case, if the set $V^P_C$ of relative velocities $V^P_{CN}$ which may be actual relative velocities including aliasing in the range in which $V^P_{CN}$ is larger than −$V^F$max and is not larger than $V^F$max is obtained, the set $V^1_C$ of first relative velocities is composed of −29, −15, −1, 13, and 27, and the set $V^2_C$ of second relative velocities is composed of −27, −17, −7, 3, 13, 23, and 33. This can be seen from FIG. 7. Since a value common to the set $V^1_C$ of first relative velocities and the set $V^2_C$ of second relative velocities is 13, it is possible to compute 13 as $V_R$ by Expression 5.

As described above, since the above described conditions are satisfied, and the $V^S$max of the basic parameter is the least common multiple of the detection velocity range V1max of the first parameter and the detection velocity range $V^2$max of the second parameter, if the values of the first relative velocity $V^1_{FFT}$ and the second relative velocity $V^2_{FFT}$ are obtained on the basis of the plurality of individual parameters, and the set $V^1_C$ of first relative velocities which may be actual relative velocities including aliasing in a case where the first relative velocity $V^1_{FFT}$ becomes the obtained value, and the set $V^2_C$ of second relative velocities which may be actual relative velocities including aliasing in a case where the second relative velocity $V^2_{FFT}$ becomes the obtained value are obtained, the set $V^1_C$ is composed of −29, −15, −1, 13, and 27, and the set $V^2_C$ is composed of −27, −17, −7, 3, 13, 23, and 33. Therefore, common values are narrowed down to one, and it is possible to obtain the one common value as the relative velocity of the target.

Therefore, the detection velocity range $V^F$max in the case of obtaining a velocity measurement result by combining the first relative velocities and the second relative velocities becomes the same as the detection velocity range $V^S$max of the basic parameter. Also, since the velocity resolution $V^1$min of the first parameter is equal to the velocity resolution $V^2$ min of the second parameter ($V^1$min=$V^2$ min), the velocity resolution $V^F$min in the case of obtaining a velocity measurement result by combining the first relative velocities and the second relative velocities becomes 1 km/h equal to the velocity resolution $V^1$min or $V^2$ min of each individual parameter ($V^1$min=$V^F$min=1), and thus becomes equal to $V^S$min.

(Relation Between Parameters and Waveform of Transmission Signal)

In a case of performing measurement on the basis of a plurality of individual parameters, the transmission signal ST according to each parameter is transmitted, and the relation between each parameter and the waveform of the transmission signal ST will be described below.

Figure 9:
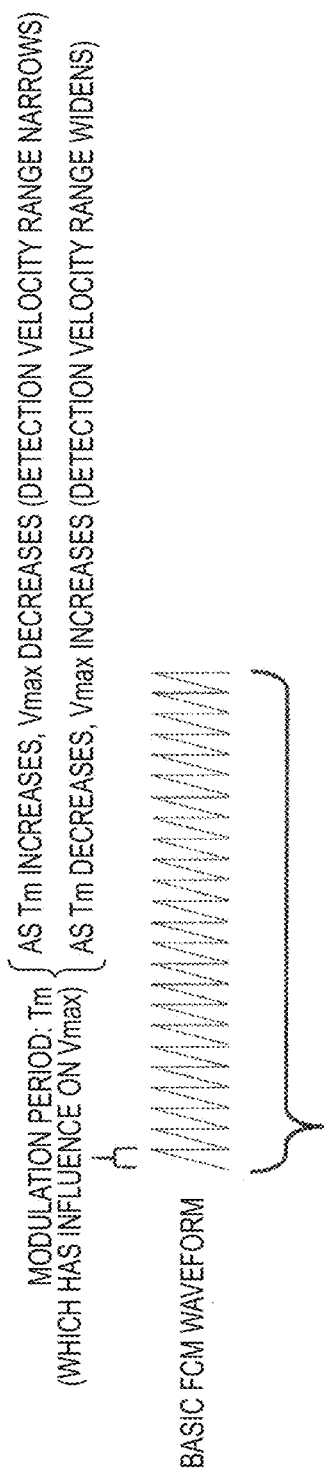
FIG. 9 is a view illustrating the relation of a parameter with a modulation period and a waveform transmission time.

FIG. 9 is a view illustrating an example of the transmission signal ST based on the basic parameter. The transmission signal ST based on the basic parameter is not transmitted from the radar device 1 of the present embodiment; however, it is shown as a comparative example in FIG. 18.

The modulation period Tm is associated with detection velocity range Vmax, and if the modulation period Tm increases, the detection velocity range Vmax narrows, and if the modulation period Tm decreases, the detection velocity range Vmax widens. Also, a waveform transmission time $T_{TX}$ is associated with the velocity resolution Vmin, and if the waveform transmission time $T_{TX}$ increases, the value of the velocity resolution Vmin decreases (the resolution increases), and if the waveform transmission time $T_{TX}$ decreases, the value of the velocity resolution Vmin increases (the resolution decreases).

Figure 10:
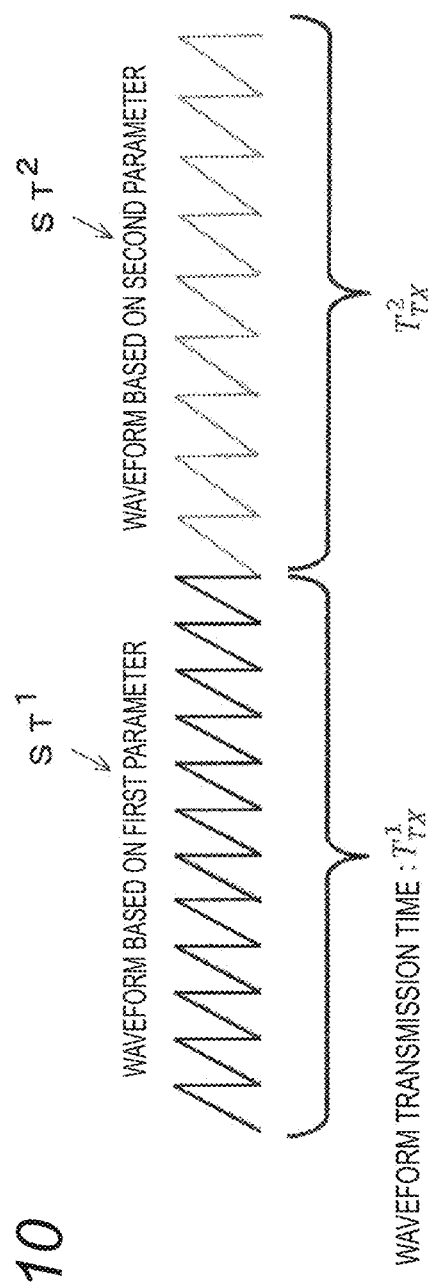
FIG. 10 is a view illustrating transmission signals $ST^P$ which are generated on the basis of a first parameter and a second parameter shown in FIG. 7.

FIG. 10 is a view illustrating a transmission signal $ST^P$ which is generated on the basis of the first parameter and the second parameter shown in FIG. 7. Since the waveform of the transmission signal ST is associated with the detection velocity range Vmax and the velocity resolution Vmin as described above, in a case of performing measurement on the basis of the first parameter and the second parameter, a transmission signal $ST^1$ generated on the basis of the first parameter and a transmission signal $ST^2$ generated on the basis of the second parameter are transmitted.

In the examples of FIG. 7, the velocity resolution $V^1$min of the first parameter, the velocity resolution $V^2$ min of the second parameter, and the velocity resolution $V^S$min of the basic parameter are equal to one another.

$$V^1\text{min}=V^2\text{min}=V^S\text{min}$$

Therefore, the transmission time $T^1_{TX}$ of the transmission signal $ST^1$ based on the first parameter and the transmission time $T^2_{TX}$ of the transmission signal $ST^2$ based on the second parameter are equal to the transmitting antenna TX of the transmission signal ST based on the basic parameter.

$$T^1_{TX}=T^2_{TX}=T_{TX}$$

Therefore, the time ($T^1_{TX}+T^2_{TX}$) for which the transmission signals $ST^1$ and $ST^2$ based on the first parameter and the second parameter are transmitted becomes twice the time $T_{TX}$ for which the transmission signal ST based on the basic parameter is transmitted.

Effects of First Embodiment

In the present embodiment, since the relative velocities of a target are computed on the basis of a plurality of individual parameters, and are combined, whereby the velocity measurement result of the relative velocity of the target is obtained, even in a case where the actual relative velocity of the target has exceeded the detection velocity range of each individual parameter, whereby velocity aliasing has occurred, it is possible to obtain an accurate value as the velocity measurement result.

Especially, since the value of the detection velocity range $V^S$max of the basic parameter becomes the least common multiple of the detection velocity ranges $V^P$max of the individual parameters, if the values of the relative velocities $V^P_{FFT}$ are obtained on the basis of the plurality of individual parameters, respectively, and the sets $V^P_C$ of relative velocities which may be actual relative velocities including aliasing in cases where the relative velocities $V^P_{FFT}$ become the computed values are obtained, common values are narrowed down to one, and it is possible to obtain the one common value as the relative velocity of the target. Therefore, it is possible to obtain an accurate velocity measurement result in the detection velocity range $V^S$max of the basic parameter wider than the detection velocity range $V^P$max of each individual parameter. In other words, even in a case where the actual relative velocity has exceeded the detection velocity range $V^P$max of each individual parameter, whereby velocity aliasing has occurred, it is possible to obtain an accurate value as the velocity measurement result in the range determined by the least common multiple of the individual parameters. Therefore, it is possible to set the period Tm of the transmission signal ST in a case of performing measurement on the basis of the individual parameters so as to be longer than that in a case of performing measurement on the basis of the basic parameter, and thus it is possible to suppress a velocity required for the A/D converters 5 so as to be lower as compared to the case of performing measurement on the basis of the basic parameter.

Also, as shown in FIG. 7, the number $M^S$ of velocity bins in the case of performing measurement on the basis of the basic parameter becomes 70 by Expression 1. In contrast, the number $M^1$ of velocity bins in a case of performing measurement on the basis of the first parameter is 14, and the number $M^2$ of velocity bins in a case of performing measurement on the basis of the second parameter is 10, and the number $M^F$ of velocity bins for obtaining a velocity measurement result (an integral result) by combining the first relative velocities and the second relative velocities is 24. As described above, in the present embodiment, since the relative velocities based on the plurality of individual parameters are combined, whereby the velocity measurement result is obtained, even in a case of performing measurement in the same detection velocity range as that of the basic parameter at the same velocity resolution as that of the basic parameter, it is possible to make the number $M^F$ of velocity bins smaller than the number $M^S$ of velocity bins based on the basic parameter. Therefore, it is possible to reduce the number of FFT processes, and it is possible to reduce the amount of computation.

Second Embodiment

In the first embodiment, an example in which individual parameters having the same velocity resolution Vmin are used to perform measurement has been described. However, in the present invention, an example in which individual parameters having different velocity resolutions Vmin are used to perform measurement is shown. The present embodiment is the same as the first embodiment in the device configuration of FIG. 2, the flow chart of signal processing of FIG. 5, and the like. Therefore, descriptions of identical elements will not be made, and different elements will be mainly described.

Figure 11:
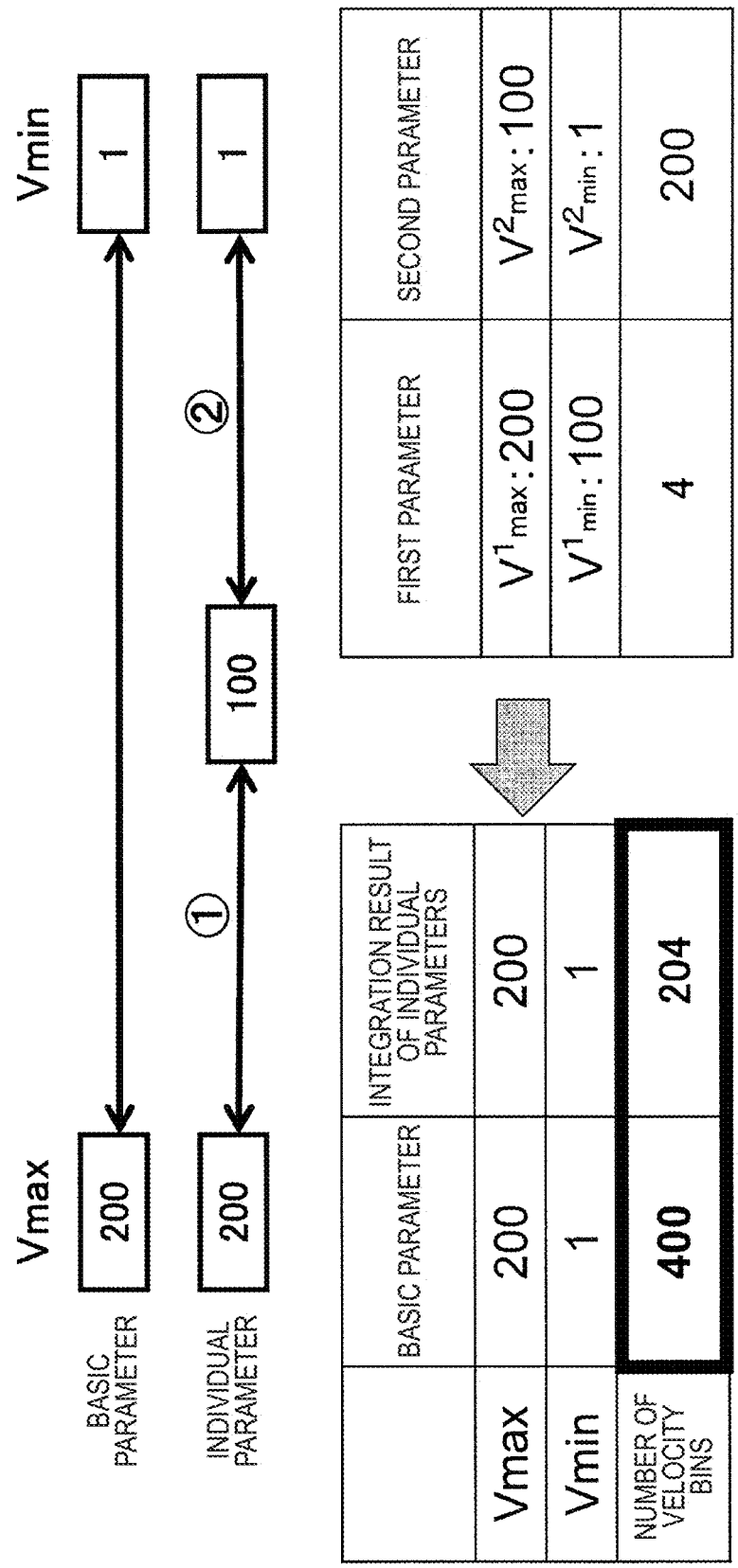
FIG. 11 is a view illustrating setting examples of parameters having detection velocity ranges Vmax and velocity resolutions Vmin.

FIG. 11 shows setting examples of parameters having detection velocity ranges Vmax and velocity resolutions Vmin. In the examples of FIG. 11, with respect to the basic parameter, the detection velocity range Vmax is set to 200 km/h, and the velocity resolution Vmin is set to 1 km/h. Also, with respect to the first parameter, the first detection velocity range $V^1$max is set to 200 km/h, and the first velocity resolution $V^1$min is set to 100 km/h, and with respect to second parameter, the second detection velocity range $V^2$max is set to 100 km/h, and the second velocity resolution $V^2$ min is set to 1 km/h. As described above, the first parameter is for performing velocity measurement on a wider detection velocity range (200 km/h) at a lower velocity resolution (100 km/h) as compared to the second parameter, and the second parameter is for performing velocity measurement in a narrower detection velocity range (100 km/h) at a higher velocity resolution (1 km/h). Also, the second velocity resolution $V^2$ min (1 km/h) of the second parameter is equal to the velocity resolution $V^S$min (1 km/h) of the basic parameter.

Figure 12:
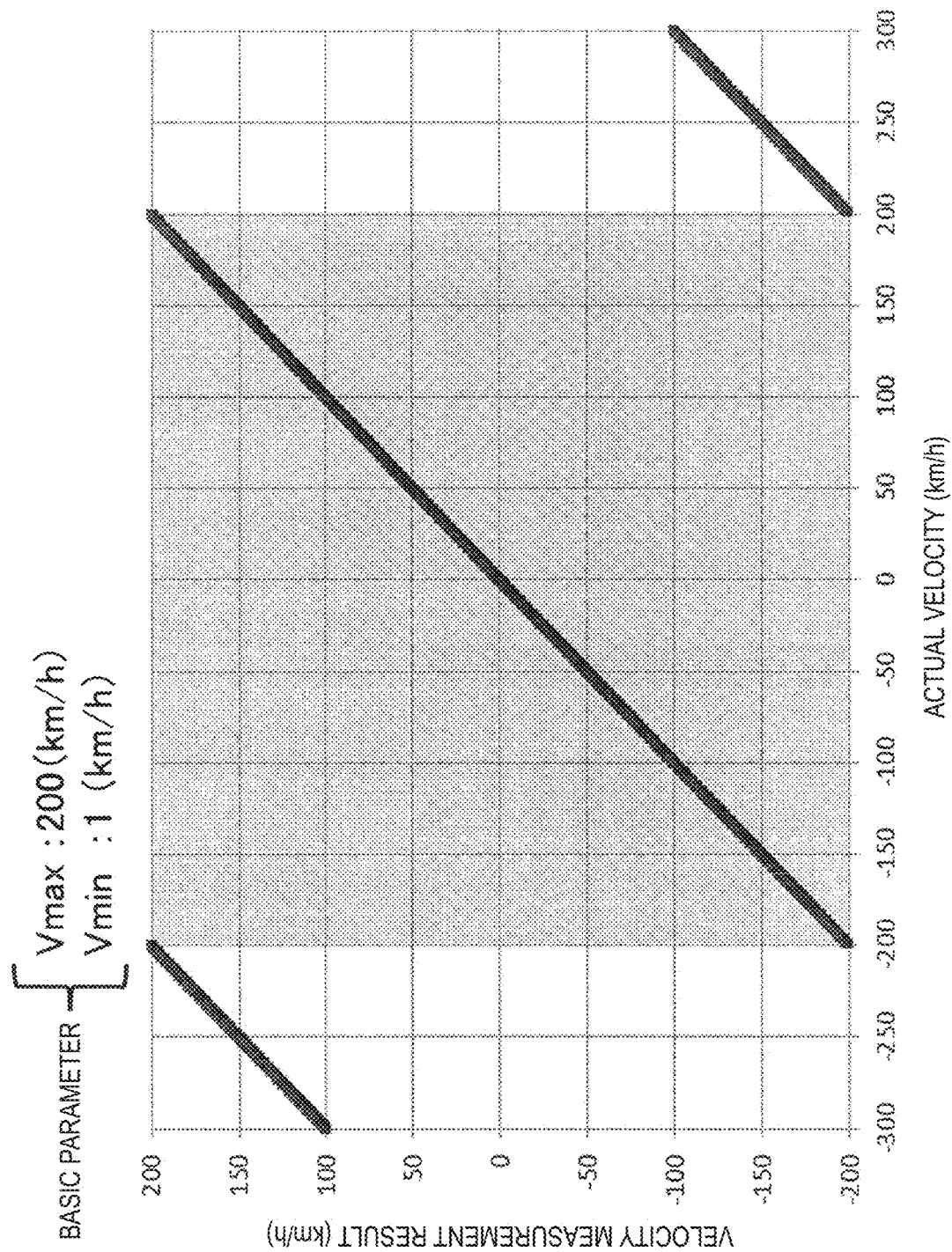
FIG. 12 is a view illustrating actual velocities and measurement results in a case of performing velocity measurement on the basis of the basic parameter shown in FIG. 11.

FIG. 12 is a view illustrating actual velocities and measurement results in a case of performing velocity measurement on the basis of the basic parameter shown in FIG. 11. As shown in FIG. 12, in the case of performing velocity measurement on the basis of the basic parameter, the detection velocity range $V^S$max is 200 km/h, and it is possible to detect relative velocities in the range between −199 km/h and 200 km/h at the velocity resolution $V^S$min of 1 km/h, and the measurement results are equal to the actual relative velocities. However, in this case of performing measurement on a wide detection velocity range $V^S$max, an FFT process should be repeated according to the number of velocity bins, and thus an amount of computation becomes huge.

Figure 13:
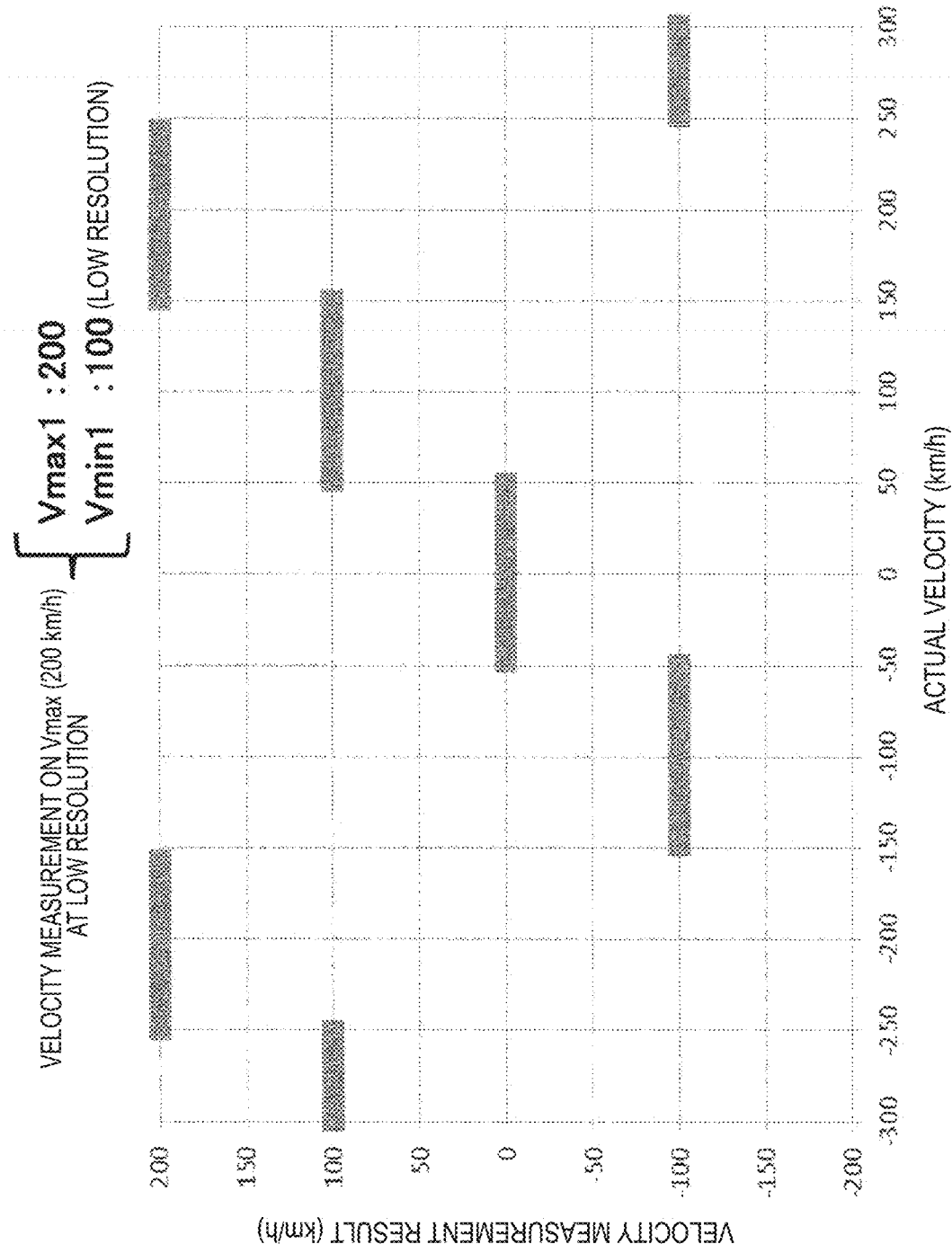
FIG. 13 is a view illustrating actual velocities and measurement results in a case of performing velocity measurement on the basis of the first parameter.

FIG. 13 is a view illustrating actual relative velocities and velocity measurement results in a case of performing velocity measurement on the basis of the first parameter. As shown in FIG. 13, in the case of performing velocity measurement on the basis of the first parameter, the detection velocity range $V^1$max is 200 km/h, and in the range between −100 km/h and 200 km/h, relative velocities are detected at the first velocity resolution $V^1$min of 100 km/h which is a low resolution. Therefore, although the detection velocity range $V^1$max is the same as the detection velocity range $V^S$max of the basic parameter, relative velocities are roughly detected like −100 km/h, 0 km/h, 100 km/h, and 200 km/h.

Figure 14:
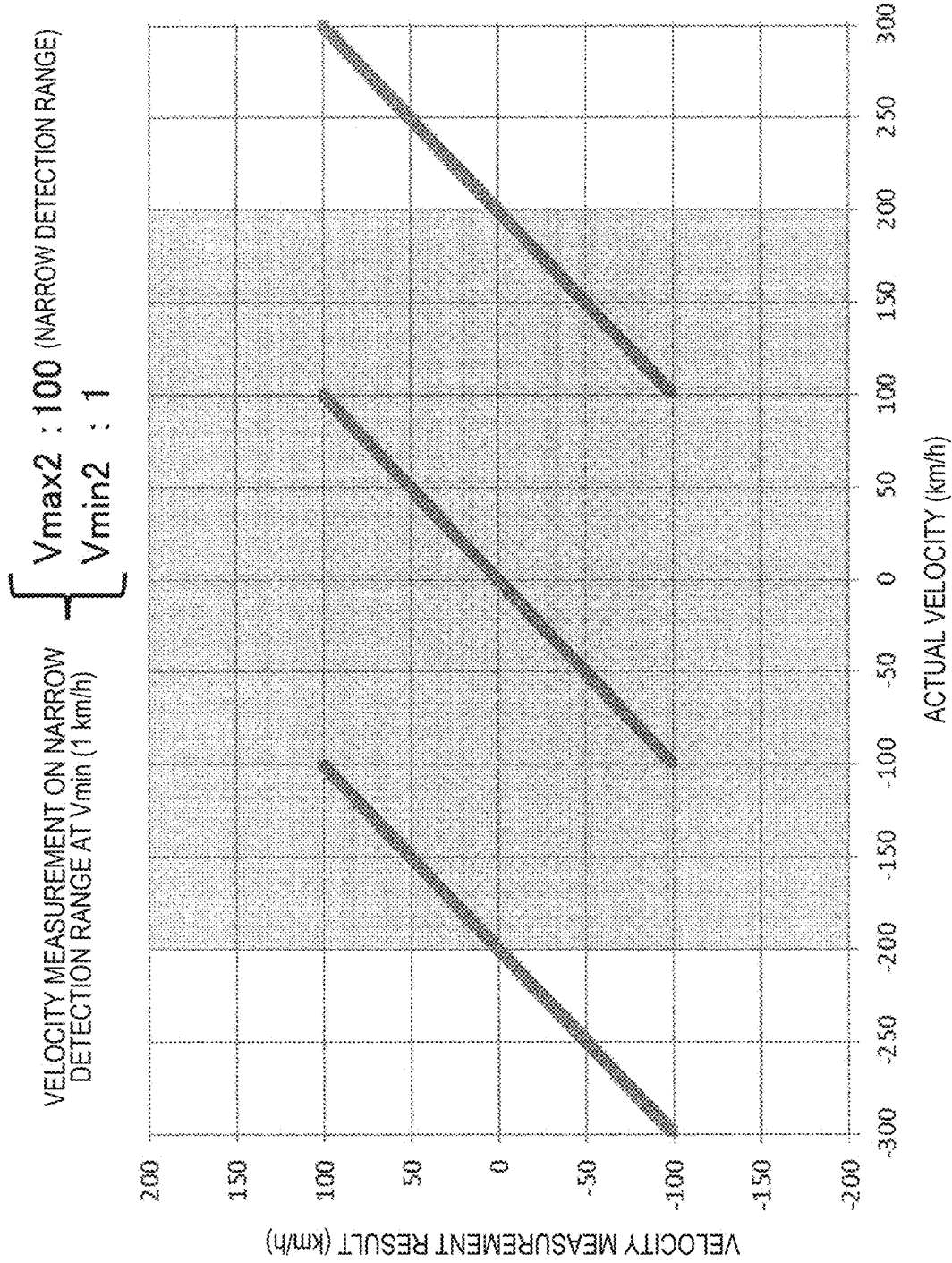
FIG. 14 is a view illustrating actual velocities and measurement results in a case of performing velocity measurement on the basis of the second parameter.

FIG. 14 is a view illustrating actual relative velocities and velocity measurement results in a case of performing velocity measurement on the basis of the second parameter. As shown in FIG. 14, in the case of performing velocity measurement on the basis of the second parameter, the detection velocity range $V^2$max is 100 km/h, and in the range between −99 km/h and +100 km/h, it is possible to detect relative velocities at the second velocity resolution $V^2$ min of 1 km/h, and the velocity measurement results are equal to the actual relative velocities. However, since the relative velocity range is narrower than the reference velocity range, if an actual relative velocity is out of the range between −100 km/h and +100 km/h, a relative velocity based on an alias signal is detected.

Figure 15:
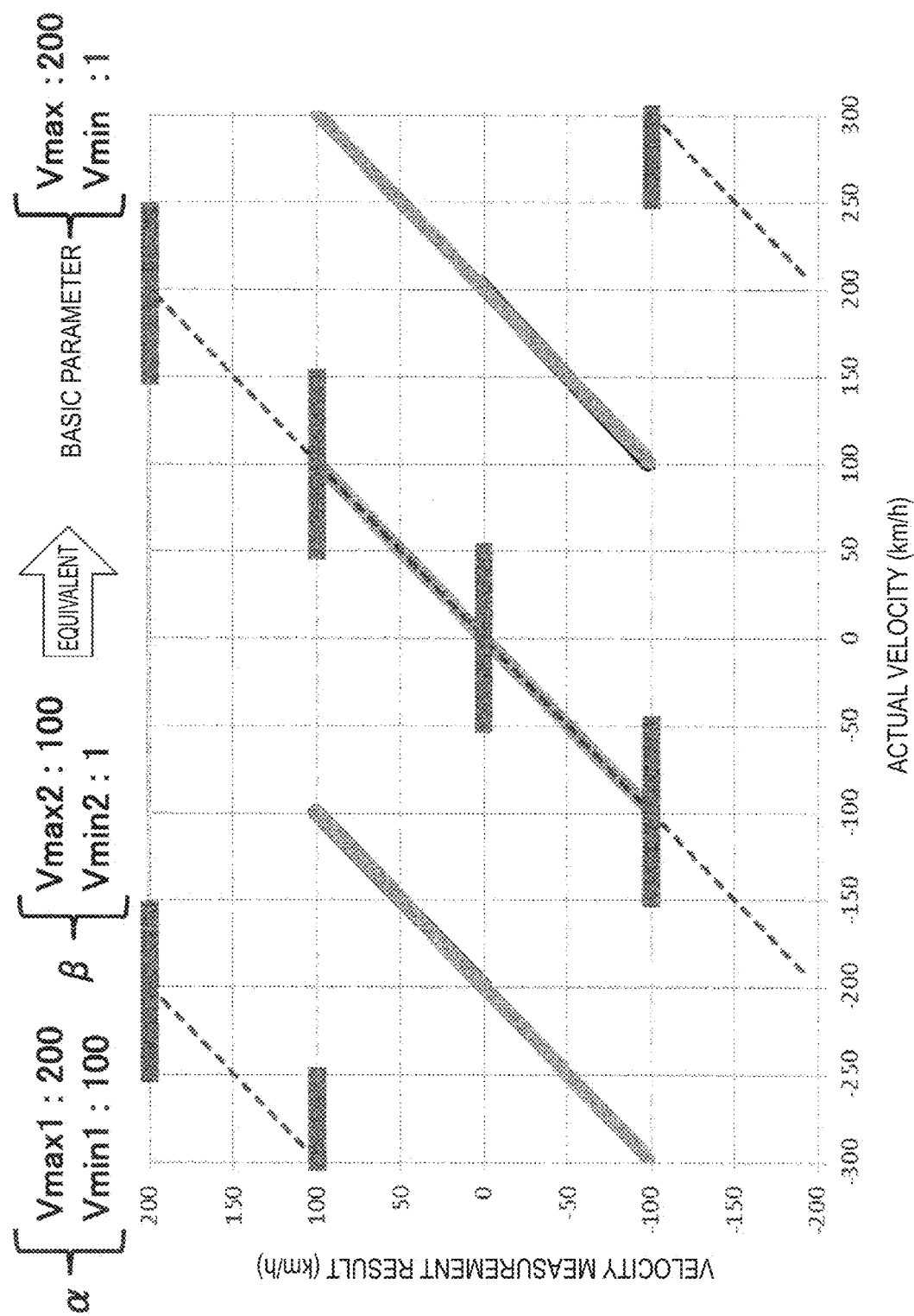
FIG. 15 is an explanatory view of a case of integrating the measurement results based on the first parameter and the second parameter.

For this reason, in the present embodiment, the velocity measurement result based on the first parameter and the velocity measurement result based on the second parameter are integrated, whereby it is possible to detect the relative velocity between the target and the vehicle in the same detection velocity range as that of the basic parameter at the same velocity resolution as that of the basic parameter. As shown in FIG. 12, in the case of performing velocity measurement on the basis of the second parameter, if an actual relative velocity is out of the range between −99 km/h and 100 km/h, a relative velocity based on an alias signal is detected. In a case where it is determined that the velocity measurement result $V^1_{FFT}$ of the first parameter has exceeded the detection velocity range $V^2$max of the second parameter, whereby aliasing has occurred in the velocity measurement result $V^2_{FFT}$ of the second parameter, the velocity measurement result $V^2_{FFT}$ of the second parameter is corrected. For example, if the velocity measurement result $V^2_{FFT}$ of the second parameter is 50 km/h, and the velocity measurement result $V^1_{FFT}$ of the first parameter is 0 km/h, aliasing does not occur in the velocity measurement result $V^2_{FFT}$, and thus the velocity measurement result $V^2_{FFT}$ of 50 km/h becomes the velocity measurement result $V^F$. Also, if the velocity measurement result $V^2_{FFT}$ of the second parameter is 50 km/h, and the velocity measurement result $V^1_{FFT}$ of the first parameter is −100 km/h, it can be determined that actual velocities between −199 km/h and −100 km/h are detected as alias signals. In this case, since a velocity at which the velocity measurement result $V^2_{FFT}$ becomes 50 km/h is −150 km/h as shown in FIG. 15, −150 km/h becomes a velocity measurement result $V^F$. Further, if the velocity measurement result $V^2_{FFT}$ of the second parameter is −50 km/h, and the velocity measurement result $V^1_{FFT}$ of the first parameter is 200 km/h, it can be determined that actual velocities between 101 km/h and 200 km/h are detected as alias signals. In this case, since a velocity at which the velocity measurement result $V^2_{FFT}$ becomes −50 km/h is 150 km/h as shown in FIG. 15, 150 km/h becomes the velocity measurement result $V^F$. As described above, velocity measurement results $V^F$ corresponding to the velocity measurement results $V^2_{FFT}$ in a case where velocity aliasing has occurred may be defined by a function, and be computed on the basis of the velocity measurement results $V^1_{FFT}$ and $V^2_{FFT}$. Alternatively, measurement results $V^F$ corresponding to the velocity measurement results $V^1_{FFT}$ and $V^2_{FFT}$ may be stored as a data table in advance. In this case, if velocity measurement results $V^1_{FFT}$ and $V^2_{FFT}$ are computed, a velocity measurement result $V^F$ corresponding to the combination of the velocity measurement results $V^1_{FFT}$ and $V^2_{FFT}$ is read out from the data table.

(Relation Between Parameters and Waveform of Transmission Signal)

Figure 16:
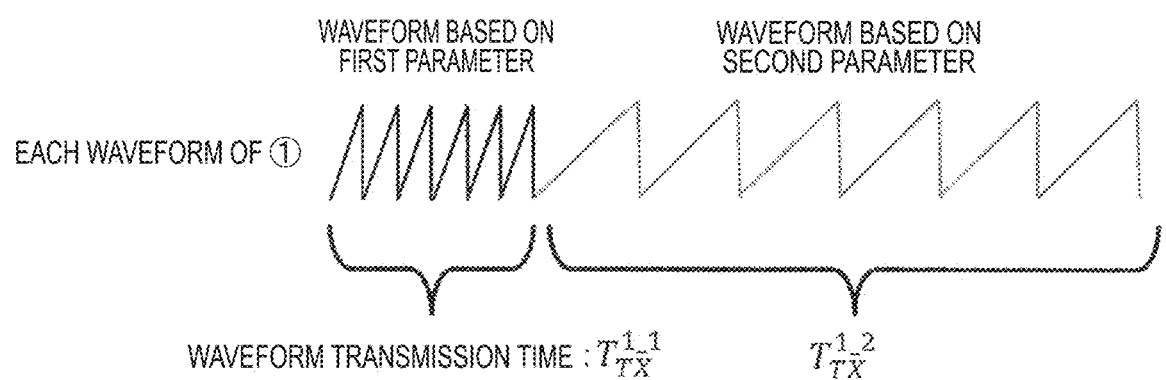
FIG. 16 is a view illustrating transmission signals $ST^P$ which are generated on the basis of the first parameter and the second parameter shown in FIG. 11.

FIG. 16 is a view illustrating transmission signals $ST^P$ which are generated on the basis of the first parameter and the second parameter shown in FIG. 11. Since the waveform of the transmission signal ST is associated with the detection velocity range Vmax and the velocity resolution Vmin as described above, the transmission signal $ST^1$ generated on the basis of the first parameter and the transmission signal $ST^2$ generated on the basis of the second parameter are transmitted.

In the examples of FIG. 11, the velocity resolution $V^1$min of the first parameter is lower than the velocity resolution $V^2$min of the second parameter, and the velocity resolution $V^2$min of the second parameter is the same as the velocity resolution $V^S$min of the basic parameter.

$$V^1\text{min} > V^2\text{min} = V^S\text{min}$$

Therefore, the transmission time $T^1_{TX}$ of the transmission signal $ST^1$ based on the first parameter is shorter than the transmission time $T^2_{TX}$ of the transmission signal $ST^2$ based on the second parameter, and the transmission time $T^2_{TX}$ of the transmission signal $ST^2$ is equal to the transmission time $T_{TX}$ of the transmission signal ST based on the basic parameter.

$$T^1_{TX} < T^2_{TX} = T_{TX}$$

Also, since the modulation period Tm of the transmission signal $ST^1$ based on the first parameter is the same as the waveform pattern based on the basic parameter, each chirp also has the same form.

In FIG. 16, an example in which the plurality of transmission signals $ST^P$ is transmitted on the basis of the plurality of individual parameters is shown. However, the present invention is not limited thereto. Portions of the transmission signal ST generated on the basis of the basic parameter may be used as the first transmission signal $ST^1$ and the second transmission signal $ST^2$.

In this case, the individual parameters are set such that the transmission signals $ST^P$ based on the individual parameters correspond to portions of the transmission signal ST based on the basic parameter. In other words, in a case where the detection velocity range and velocity resolution of the basic parameter are $V^S$max and $V^S$min, the relation between the basic parameter and each individual parameter is set to satisfy Expressions 10 and 11.

$$M^S \bmod\left(\frac{2 * V^P_{max}}{V^S_{min}}\right) = 0 \tag{10}$$

$$M^S \bmod\left(\frac{2 * V^P_{min}}{V^S_{min}}\right) = 0 \tag{11}$$

Figure 17:
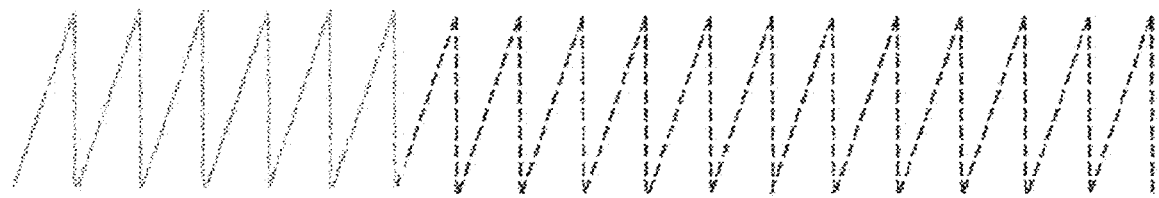
FIG. 17 is a view illustrating a part of a transmission signal ST which is based on the basic parameter and is used as a transmission signal $ST^1$ based on the first parameter.

The transmission signal $ST^1$ of the first parameter (P=1) has the same modulation period Tm as that of the transmission signal ST of the basic parameter, and thus is the same as a portion extracted from the transmission signal ST. Therefore, the transmission signal $ST^1$ satisfies Expressions 10 and 11. FIG. 17 is a view illustrating a portion of the transmission signal ST based on the basic parameter which is used as the transmission signal $ST^1$ based on the first parameter. In FIG. 17, the whole waveform represents the transmission signal ST based on the basic parameter, and a portion which is used as the transmission signal $ST^1$ based on the first parameter is shown by a solid line, and the other portion is shown by a broken line.

Figure 18:
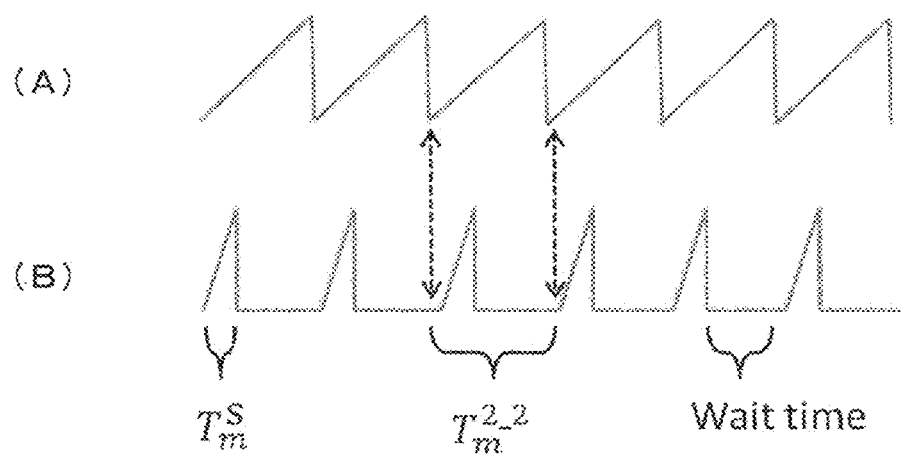
FIG. 18 is a view illustrating an example (see (A)) of a second transmission signal $ST^2$ and a modification example (see (B)) of the waveform shown in (A)

Now, the second transmission signal $ST^2$ based on the second parameter (P=2) will be described. FIG. 18 is a view illustrating an example of the second transmission signal $ST^2$. In FIG. 18, (A) shows a waveform generated on the detection velocity range and the velocity resolution of the second parameter, similar to the second transmission signal $ST^2$ of FIG. 17. In FIG. 18, (B) shows an equivalent waveform of the second transmission signal $ST^2$. In (B) of FIG. 18, the modulation period of a single chirp is $Tm^S$; however, an actual valid modulation period includes a wait time. The sum of $Tm^S$ and a wait time of (B) of FIG. 18 becomes the modulation period $Tm^2$ of the second transmission signal $ST^2$ of (B) of FIG. 18. Therefore, the waveform of (B) of FIG. 18 can be used as chirps for performing measurement on the same detection velocity range as that of the second transmission signal $ST^2$ of (A) of FIG. 18. This modification is possible since $Tm^2$ is the product of $Tm^S$ with an integer by Expressions 10 and 11.

Figure 19:
FIG. 19 is a view for explaining extraction of the waveform of the modified second transmission signal $ST^2$ of FIG. 18 from a basic waveform.

As the transmission signal $ST^2$ of (A) of FIG. 18, portions of the transmission signal ST cannot be used. However, in the case of the waveform of (B) of FIG. 18, since the modulation period $Tm^S$ of a single chirp is the same as that of the transmission signal ST, portions of the transmission signal ST can be used as the second transmission signal $ST^2$. FIG. 19 shows an example in which second transmission signals $ST^2$ are extracted from the transmission signal ST. In FIG. 19, the whole waveform represents the transmission signal ST based on the basic parameter, and portions which are used as the transmission signal $ST^2$ based on the second parameter are shown by solid lines, and the other portions are shown by broken lines. Like this, among the individual chirps of the transmission signal ST, chirps at intervals of a predetermined number of chirps are used as the second transmission signal $ST^2$.

FIGS. 17 and 18 show that it is possible to extract a transmission signal $ST^P$ based on each individual parameter from the transmission signal ST based on the basic parameter. However, the transmission signal $ST^P$ is not extracted and transmitted. The transmission signal ST is transmitted as transmission signals $ST^P$, and the reflected waves of the transmission signal ST from a target are received as reception signals. Then, from the beat signals, signals of portions corresponding to the transmission signals $ST^P$, respectively, are extracted, whereby it is possible to obtain beat signals based on each individual parameter. The subsequent signal processing is the same as that of the above described example.

As described above, in the present embodiment, since the velocity measurement results based on the plurality of parameters are integrated, it is possible to improve velocity measurement performance as compared to a case based on a single parameter. In this case, it is possible to reduce the amount of computation of FFT processes as compared to a case of satisfying the velocity measurement performance of the integration result with a single parameter.

For example, FIG. 20 is a flow chart in a case of performing measurement on the basis of the basic parameter.

The processor 6 acquires signals obtained by A/D conversion of the A/D converters 5 (ch1 to ch4) in STEP S110, and performs an FFT process in the range bin direction in STEP S120. At this time, the processor 6 repeats the FFT process of STEP S120 on each of the beat signals B1 to BM, until the number M of FFT processes reaches the number of beat signals B1 to BM (the number of chirps) (STEP S130).

Subsequently, in STEP S140, the processor 6 performs an FFT process on the results of the FFT processes of the range bin direction, at regular distance intervals, that is, for each range bin. At this time, the processor 6 repeats the FFT process of STEP S140 until the number of FFT processes reaches a predetermined number $N_R$ of times, that is, the number of range bins. Specifically, if the number of FFT processes is not $N_R$ ("No" in STEP S150), the processor returns to STEP S140; whereas if the number of FFT processes is $N_R$ ("Yes" in STEP S150), the processor proceeds to STEP S160.

As described above, in the case of performing measurement on the basis of the basic parameter, the processor repeats the FFT process of the range bin direction the same number of times as the number $N_V$ of velocity bins, and repeats the FFT process of the velocity bin direction the same number of times as the number $N_R$ of range bins. In this case, the amount of FFT computation becomes $5N_V N_R \log(N_V N_R)$.

Figure 21A:
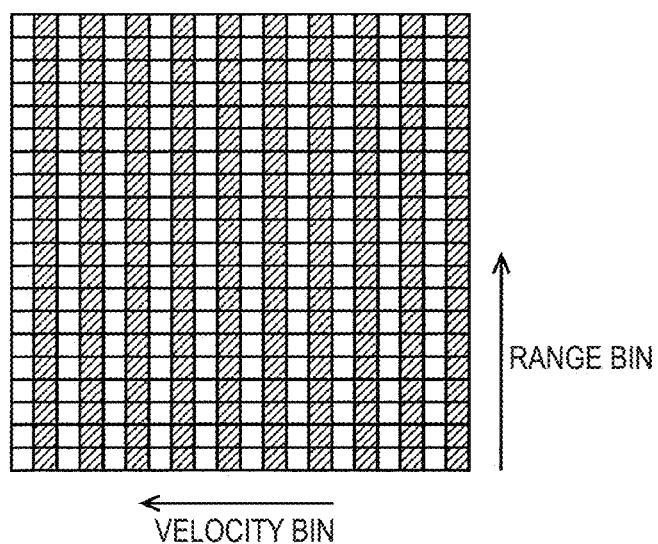
FIG. 21A is an explanatory view of data on which an FFT process is performed on the basis of the second parameter.
Figure 21B:
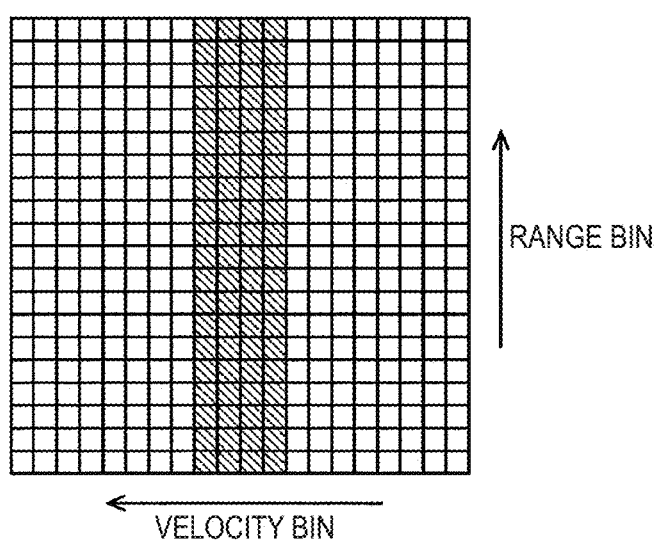
FIG. 21B is an explanatory view of the data on which an FFT process is performed on the basis of the first parameter.
Figure 21C:
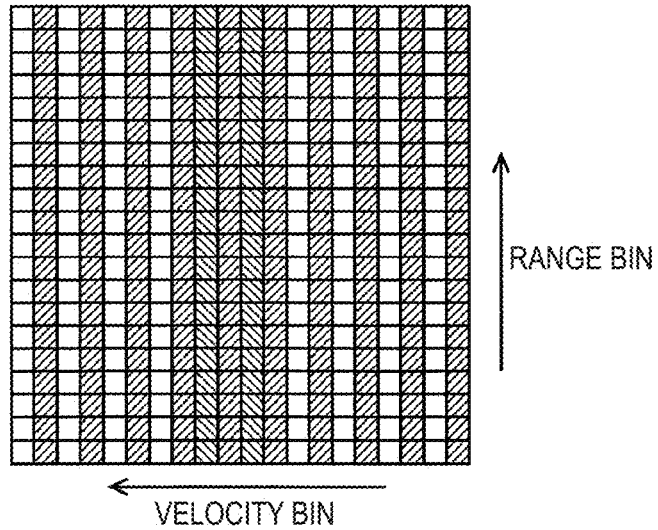
FIG. 21C is a view collectively illustrating the data of FIG. 21A and FIG. 22B on which an FFT process is performed on the basis of the plurality of parameters.

FIGS. 21A to 21C are explanatory views of data in which velocity bins are arranged in the transverse direction and range bins are arranged in the longitudinal direction and on which FFT processes are performed on the basis of the individual parameters. The velocity bins are set on the basis of the velocity resolution $V^S$min of the basic parameter. In the case of the basic parameter shown in FIG. 11, since the velocity bins are set at intervals of 1 km/h, and the detection velocity range $V^S$max is 20 km/h, the number of velocity bins is 400. Also, FIGS. 21A to 21c are views schematically illustrating the data which is used in velocity measurement and in which the number and intervals of velocity bins match with those of the parameter of FIG. 11.

FIG. 21A shows the data on which an FFT process is performed on the basis of the second parameter. Since the second parameter has the same velocity resolution $V^2$ min as that of the basic parameter, and the detection velocity range $V^2$max narrower than that of the basic parameter, with respect to velocity bins of the same range as the basic parameter, the velocity bins are thinned out, and then an FFT process is performed. If the detection velocity range $V^2$max is narrower than the detection velocity range $V^S$max of the basic parameter, the thinning intervals of the velocity bins become wider; whereas if the detection velocity range $V^2$max is wider than the detection velocity range $V^S$max, the thinning intervals become narrower. Also, if the velocity resolution $V^2$ min is lower than the velocity resolution $V^S$min of the basic parameter, the velocity bin range for obtaining FFT process results becomes wider; whereas if the velocity resolution $V^2$ min is higher than the velocity resolution $V^S$min of the basic parameter, the velocity bin range for obtaining FFT process results becomes narrower. In the case of the parameters shown in FIG. 11, since the detection velocity range $V^S$max of the basic parameter is 200 km/h, whereas the detection velocity range $V^2$max is 100 km/h, with respect to every other velocity bin, an FFT process result is obtained. Also, in the case of the parameters shown in FIG. 11, since the detection velocity range $V^S$max of the basic parameter is 200 km/h, whereas the detection velocity range $V^2$max is 100 km/h, with respect to every other velocity bin, an FFT process result is obtained.

FIG. 21B shows the data on which an FFT process is performed on the basis of the first parameter. Since the first parameter has the same detection velocity range $V^1$max as that of the basic parameter, and the velocity resolution $V^1$min lower than that of the first parameter, with respect to consecutive velocity bins, FFT process results are obtained in the range narrower than that of the basic parameter. In the case of the parameters shown in FIG. 11, since the velocity resolution $V^S$min of the basic parameter is 1 km/h, whereas the velocity resolution $V^1$min is 100 km/h, with respect to four velocity bins, FFT process results are obtained.

Also, FIG. 21C collectively shows the bins of the data which are used in velocity measurement and are shown in FIGS. 21A and 21B. In a case of performing measurement on the basis of the basic parameter as shown in the comparative example shown in FIG. 20, with respect to every velocity bin, an FFT process result is obtained. However, in the present embodiment, as shown in FIG. 21C, it is just required to obtain FFT process results of some velocity bins. Therefore, it is possible to reduce the amount of computation related to velocity measurement. In the case of the parameters shown in FIG. 11, the number of velocity bins necessary for performing velocity measurement on the basis of the basic parameter is 400, and the number of velocity bins necessary for obtaining a velocity measurement result by combining relative velocities based on the first and second parameters is 204, it is possible to significantly reduce the amount of computation. Here, the number of velocity bins necessary for obtaining a velocity measurement result by the combination of the plurality of parameters is smaller than the number of velocity bins necessary for performing velocity measurement on the basis of the basic parameter, and may be set to a number appropriate for a frequency analysis method to be used. For example, in the present embodiment, since FFT processes are performed, the number of velocity bins necessary for obtaining a velocity measurement result by the combination of the plurality of parameters may be set to a multiplier of 2 or a value close to a multiplier of 2.

As described above, according to the present embodiment, since a velocity measurement result is obtained by combining the relative velocities based on the first and second parameters, even in a case where the actual relative velocity of the target has exceeded the detection velocity range of the second parameter, whereby velocity aliasing has occurred, it is possible to obtain an accurate velocity measurement result in the detection velocity range of the first parameter at the velocity resolution of the second parameter.

Also, according to the present embodiment, since the velocity measurement result is obtained by combining relative velocities based on the first and second parameters, it is possible to reduce the amount of computation related to velocity measurement. Especially, in the present embodiment, since the velocity measurement result is obtained by combining the first and second relative velocities based on the first parameter for performing velocity measurement on the wide detection velocity range (200 km/h) at the low velocity resolution (100 km/h) and the second parameter for performing velocity measurement on the narrow detection velocity range (100 km/h) at the same velocity resolution (1 km/h) as that of the basic parameter, even in a case of obtaining a velocity measurement result in the detection velocity range of the basic parameter at the velocity resolution of the basic parameter, it is possible to reduce the number of FFT processes necessary for velocity measurement, and it is possible to reduce the computation load.

Third Embodiment

In a parameter group including at least the first individual parameter and the second individual parameter, a parameter which is the n-th (wherein "n" is a natural number) is referred to as the n-th parameter. In the above described embodiments, an example in which two individual parameters are used, that is, "n" is 1 or 2 has been described. However, the number of parameters is not limited to two, and three or more parameters may be used to perform measurement. The present embodiment is the same as the first and second embodiments in the device configuration of FIG. 2, the flow chart of signal processing of FIG. 5, and the like. Therefore, descriptions of identical elements will not be made, and different elements will be mainly described.

In a case of performing velocity measurement by combining a plurality of individual parameters, there are two main integration procedures. A first integration procedure is a procedure of obtaining a relative velocity (hereinafter, also referred to as an integration value) by integration based on the combination of two individual parameters of the n-number of individual parameters, and repeating integration between the integral relative velocity and an uncombined relative velocity until there is no uncombined relative velocity, thereby obtaining a velocity measurement result.

Figures 22, 23, 24:
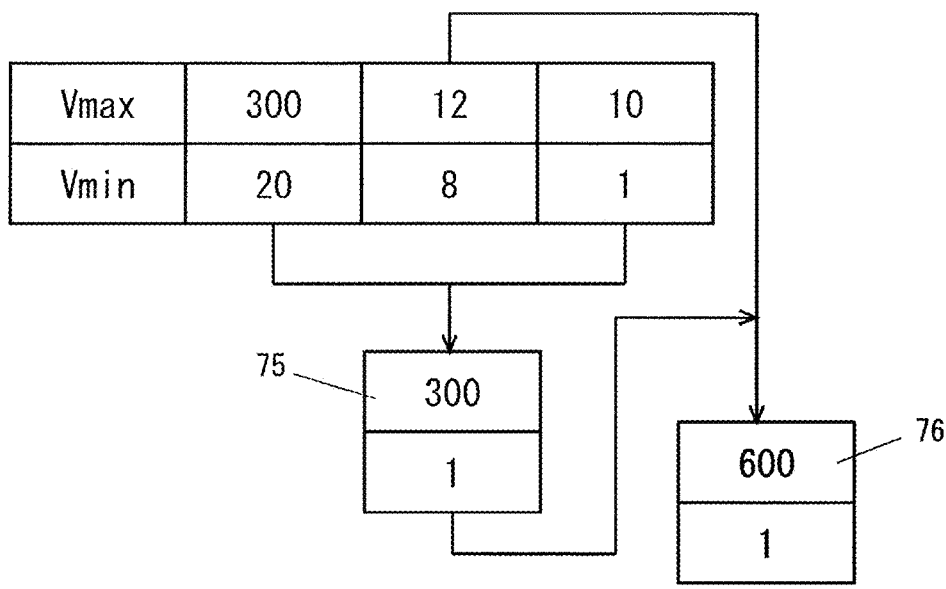
FIG. 22 is an explanatory view of a first integration procedure.
FIG. 23 is an explanatory view of individual parameters which are integrated by the procedure of FIG. 22.
FIG. 24 is an explanatory view of individual parameters which are integrated by a second integration procedure.

FIG. 22 is a view illustrating the first integration procedure, and FIG. 23 is a view illustrating examples of individual parameters which are integrated by the procedure of FIG. 22.

On the basis of the n-number of individual parameters, n-number of relative velocities is obtained, respectively. The n-number of relative velocities are arranged in the ascending order of the velocity resolutions $V^P$min of the individual parameters, such that a relative velocity corresponding to a small velocity resolution $V^P$min is positioned on a high level, and a relative velocity corresponding to a large velocity resolution $V^P$min is positioned on a lower level. Subsequently, with respect to the combination of relative velocities based on two individual parameters of the highest-level individual parameter and an individual parameter positioned on a low level adjacent to the highest-level individual parameter, the processing of the first embodiment or the second embodiment described above is performed, whereby an integral relative velocity is obtained, and the two individual parameters are integrated, whereby a detection velocity range and a velocity resolution are obtained as the integration result. Then, in a case where there are uncombined individual parameters, the parameter of the integration result and the uncombined individual parameters are arranged in the ascending order of the velocity resolutions $V^P$min thereof, and are sequentially integrated every two adjacent individual parameters. The integration is repeated until there is no uncombined individual parameter, that is, there is no uncombined relative velocity, and an integral relative velocity when there is no uncombined relative velocity is obtained as the velocity measurement result of the relative velocity of the target.

In this case, when the product of the values $M^P$ of two adjacent individual parameters is $M^{M(P,P')}$, and the value M of the integration result of the parameters is $M^{F(P,P')}$, $M^{F(P,P')}$ should not be larger than $M^{M(P,P')}$. However, when individual parameters arranged on a high level and a low level with respect to the velocity resolutions $V^P$min are X and Y, respectively, if conditions of ($V^X$min≤2×$V^Y$max) and ($M^{M(X,Y)}$≥$M^{F(X,Y)}$) are satisfied, even though the parameters are not adjacent to each other, the parameters are preferentially integrated. Here, a state where the value $M^F$ of the final integration result and the product $M^{M(1, 2, \ldots, PL)}$ of the values M of all parameters are equal to $M^S$ ($M^S=M^F=M^{M(1, 2, \ldots, PL)}$) is a state where there is no redundancy with respect to $M^F$. Also, when $M^F$ is larger than $M^{M(1, 2, \ldots, PL)}$, the parameters do not satisfy the conditions.

In the examples of FIG. 23, "n" is an integer between 1 and 3, and the detection velocity range $V^1$max and velocity resolution $V^1$min of the first individual parameter are 300 km/h and 20 km/h, respectively, and the detection velocity range $V^2$max and velocity resolution $V^2$ min of the second individual parameter are 12 km/h and 8 km/h, respectively, and the detection velocity range $V^3$max and velocity resolution $V^3$ min of the third individual parameter are 10 km/h and 1 km/h, respectively. If the first to third individual parameters are arranged in the ascending order of their velocity resolutions $V^P$min, they are arranged in the order of the third individual parameter having the velocity resolution $V^3$ min of 1 km/h, the second individual parameter having the velocity resolution $V^2$ min of 8 km/h, and the first individual parameter having the velocity resolution $V^1$min of 20 km/h. Therefore, in principle, the relative velocities of the third individual parameter and the second individual parameter should be combined. However, in the parameters of FIG. 23, since the third individual parameter and the first individual parameter satisfy the conditions of ($V^X$min≤2×$V^Y$max) and ($M^{M(X,Y)}$≥$M^{F(X,Y)}$, in the integration procedure of FIG. 22, first, the relative velocities of the third individual parameter and the first individual parameter are preferentially combined, and an integral relative velocity is obtained on the basis of that combination. The integration result is shown by a reference symbol "75" in FIG. 22. In this case, since the integration result 75 is obtained from the third individual parameter and the first individual parameter, a detection velocity range $V^{75}$max becomes 300 km/h, and a velocity resolution $V^{75}$ min becomes 20 km/h. Further, the integration result 75 is combined with the relative velocity of the second parameter which is an uncombined individual parameter. On the basis of this combination, an integral relative velocity is obtained as the velocity measurement result of the relative velocity of the target, and an integration result 76 is obtained.

A second integration procedure is a procedure of obtaining the values of n-number of relative velocities on the basis of the n-number of individual parameters, respectively, and obtaining actual relative velocities which include aliasing and at which relative velocities become the obtained values, with respect to each individual parameter, like in the first embodiment, and obtaining a value common to the parameters, as the relative velocity of the target. In other words, in the second integration procedure, the n-number of individual parameters are combined at once.

FIG. 24 is a view illustrating examples of individual parameters which are combined by the second integration procedure. In the examples of FIG. 24, the detection velocity range $V^S$max and velocity resolution $V^S$min of the basic parameter are 18 km/h and 1 km/h, respectively, and the detection velocity range $V^1$max and velocity resolution $V^1$min of the first individual parameter are 9 km/h and 2 km/h, respectively, and the detection velocity range $V^2$max and velocity resolution $V^2$ min of the second individual parameter are 2 km/h and 1 km/h, respectively, and the detection velocity range $V^3$max and velocity resolution $V^3$ min of the third individual parameter are 6 km/h and 4 km/h, respectively. In other words, in the examples of FIG. 24, "n" is an integer between 1 and 3, and there are the first to third individual parameters. Also, in the examples of FIG. 24, the first to third relative velocity ranges $V^P$max are different from one another, and the least common multiple of the ranges $V^P$max of the first to third individual parameters is 18 equal to the value of the detection velocity range $V^S$max of the basic parameter.

In a case of performing velocity measurement, the values of the first to third relative velocities are obtained on the basis of the first to third individual parameters, respectively, and actual relative velocities which include aliasing and at which relative velocities may become the obtained values are obtained with respect to each individual parameter, like in the first embodiment, and a value common to the parameters is obtained as the relative velocity of the target. In other words, the n-number of individual parameters are combined at once.

For example, if an actual relative velocity $V_R$ is 12, the first relative velocity $V^1_{FFT}$, the second relative velocity $V^2_{FFT}$, and the third relative velocity $V^3_{FFT}$ become −6, 0, and 0, respectively. In this case, when the set of relative velocities which are included in a range in which a condition of $(-V^F max < V^P_{CN} \leq V^F max)$ is satisfied and may be actual velocities including aliasing is $V^P_S$, the set $V^1_C$ of first relative velocities is composed of values between −6 and −5 and values between 12 and 13, and the set $V^2_C$ of second relative velocities is composed of −16, −12, −8, −4, 0, 4, 8, 12, and 16, and a set $V^3_C$ of third relative velocities is composed of values between −13 and −11, values between −1 and 1, and values between 11 and 13. A value common to the sets $V^P_C$ of first to third relative velocities is 12, and thus it is possible to compute 12 as $V_R$ by Expression 5.

As described above, according to the present embodiment, it is possible to perform measurement using three or more parameters, and it is possible to further decrease the amount of computation.

Although the preferred embodiments of the present invention have been described above, the radar device according to the present invention is not limited thereto, and can include every combination thereof. Also, in the embodiments, a case of using the FCM system as a distance measuring system for detecting the distance and relative velocity between a target and the vehicle has been described. However, the technology related to the radar device according to the present invention can be applied to other systems such as a pulse Doppler system, as long as they are for detecting a Doppler shift on the basis of phase change between a plurality of chirps or pulse signals, not the frequencies of beat signals.

What is claimed is:

1. A radar device comprising:
   a transmitting unit configured to transmit, at least, a first transmission signal generated on the basis of a first parameter for computing a first relative velocity in a first detection velocity range, and a second transmission signal generated on the basis of a second parameter for computing a second relative velocity in a second detection velocity range narrower than the first detection velocity range;
   a receiving unit configured to receive the reflected wave of the first transmission signal from a target, as a first reception signal, and receive the reflected wave of the second transmission signal from the target, as a second reception signal; and
   a velocity measuring unit configured to compute the first relative velocity in the first detection velocity range on the basis of the first reception signal, and compute the second relative velocity in the second detection velocity range on the basis of the second reception signal, and obtain a velocity measurement result of the relative velocity of the target on the basis of the combination of the first relative velocity and the second relative velocity, wherein
   the first transmission signal and the second transmission signal are generated from a first portion and a second portion of a single basic transmission signal, the first portion of the single basic transmission signal being different from the second portion of the single basic transmission signal, the single basic transmission signal including a plurality of waveforms in time series generated on the basis of a basic parameter for obtaining a relative velocity as the velocity measurement result, and
   the velocity measuring unit computes the first relative velocity and the second relative velocity based on a phase difference in the plurality of waveforms in time series.

2. The radar device according to claim 1,
   wherein the transmitting unit generates the first transmission signal at a first velocity resolution which is determined as the first parameter, and generates the second transmission signal at a second velocity resolution higher than the first velocity resolution, and
   wherein the velocity measuring unit computes the first relative velocity in the first detection velocity range at the first velocity resolution on the basis of the first reception signal, and computes the second relative velocity in the second detection velocity range at the second velocity resolution on the basis of the second reception signal, and obtains the velocity measurement result of the relative velocity of the target on the basis of the combination of the first relative velocity and the second relative velocity.

3. The radar device according to claim 2, wherein
   the single basic transmission signal is generated on the basis of a detection velocity range for obtaining the relative velocity as the velocity measurement result, and the first and second portions of the single basic transmission signal are transmitted as the first transmission signal and the second transmission signal.

4. The radar device according to claim 1, wherein
   the first detection velocity range and the second detection velocity range regarding the first parameter and the second parameter are determined respectively in accordance with waveforms transmitted at different timings from among the plurality of waveforms included in the single basic transmission signal based on the single basic parameter used to compute the relative velocity.

5. The radar device according to claim 1, wherein
   a detection velocity range for obtaining a relative velocity as the velocity measurement result is greater than either of the first detection velocity range and the second detection velocity range.

6. The radar device according to claim 5,
wherein in a parameter group including, at least, the first parameter and the second parameter, a parameter which is the n-th (where "n" is a natural number) is referred to as an n-th parameter,
wherein the transmitting unit transmits n-th transmission signals generated on the basis of the n-th parameters, respectively,
wherein the receiving unit receives the reflected waves of the n-th transmission signals from a target, as n-th reception signals, and
wherein the velocity measuring unit computes n-th relative velocities in n-th detection velocity ranges on the basis of the n-th reception signals, respectively, and obtains the velocity measurement result of the relative velocity of the target, on the basis of the combination of the n-th relative velocities.

7. The radar device according to claim 6, wherein
a value representing a detection velocity range for obtaining the relative velocity as the velocity measurement result is the least common multiple of the values of the n-th detection velocity ranges determined on the basis of the n-th parameters.

8. The radar device according to claim 6, wherein
the velocity measuring unit computes the n-th relative velocities on the basis of the plurality of n-th reception signals, and obtains an integral relative velocity on the basis of the combination of two of the n-th relative velocities, and
in a case where there is an uncombined relative velocity in the n-th relative velocities, the velocity measuring unit repeats a process of obtaining an integral relative velocity on the basis of the combination of the integral relative velocity and the uncombined relative velocity, thereby obtaining an integral relative velocity of a case where there is no uncombined relative velocity, as the velocity measurement result of the relative velocity of the target.

9. A signal processing device for a radar device comprising a velocity measuring unit configured to receive, at least, the reflected wave of a first transmission signal from a target and the reflected wave of a second transmission signal from the target, as a first reception signal and a second reception signal, respectively, and compute a first relative velocity in a first detection velocity range on the basis of the first reception signal, and compute a second relative velocity in a second detection velocity range on the basis of the second reception signal, and obtain the relative velocity of the target on the basis of the combination of the first relative velocity and the second relative velocity, the first transmission signal being generated on the basis of a first parameter for computing the first relative velocity in the first detection velocity range, and the second transmission signal being generated on the basis of a second parameter for computing the second relative velocity in the second detection velocity range narrower than the first detection velocity range, wherein
the first transmission signal and the second transmission signal are generated from a first portion and a second portion of a single basic transmission signal, the first portion of the single basic transmission signal being different from the second portion of the single basic transmission signal, the single basic transmission signal including a plurality of waveforms in time series generated on the basis of a basic parameter for obtaining a relative velocity as a velocity measurement result of the velocity measuring unit, and
the velocity measuring unit computes the first relative velocity and the second relative velocity based on a phase difference in the plurality of waveforms in time series.

10. A velocity measuring method of a radar device including a processor, the velocity measuring method comprising:
transmitting, by the processor, at least, a first transmission signal generated on the basis of a first parameter for computing a first relative velocity in a first detection velocity range, and a second transmission signal generated on the basis of a second parameter for computing a second relative velocity in a second detection velocity range narrower than the first detection velocity range;
receiving, by the processor, the reflected wave of the first transmission signal from a target, as a first reception signal, and receiving the reflected wave of the second transmission signal from the target, as a second reception signal; and
computing, by the processor, the first relative velocity in the first detection velocity range on the basis of the first reception signal, and computing the second relative velocity in the second detection velocity range on the basis of the second reception signal, and obtaining a velocity measurement result of the relative velocity of the target on the basis of the combination of the first relative velocity and the second relative velocity, wherein
the first transmission signal and the second transmission signal are generated from a first portion and a second portion of a single basic transmission signal, the first portion of the single basic transmission signal being different from the second portion of the single basic transmission signal, the single basic transmission signal including a plurality of waveforms in time series generated on the basis of a basic parameter for obtaining a relative velocity as the velocity measurement result, and
the first relative velocity and the second relative velocity are computed based on a phase difference in the plurality of waveforms in time series.

* * * * *